United States Patent [19]
Smith et al.

[11] Patent Number: 5,954,105
[45] Date of Patent: Sep. 21, 1999

[54] WORKHEAD FOR TIMBER PROCESSING

[76] Inventors: Dennis William Smith, 80 Crossmaglen Road, Crossmaglen NSW 2441, Australia; Warren Hugh Millar, 54 Emerald Heights Drive, Emerald Heights NSW 2456, Australia

[21] Appl. No.: 09/170,005

[22] Filed: Oct. 13, 1998

Related U.S. Application Data

[62] Division of application No. 08/653,342, May 24, 1996.

[51] Int. Cl.$^6$ .................................................. A01G 23/08
[52] U.S. Cl. .............................. 144/4.1; 60/414; 92/12.2; 92/106; 92/116; 144/34.1; 144/336; 144/248.1; 144/248.5; 144/248.7; 414/694
[58] Field of Search ............................ 92/106, 116, 12.2, 92/505, 12.1; 414/680, 694, 695.5; 144/4.1, 24.13, 34.1, 34.5, 335, 336, 338, 343, 246.1, 248.5, 248.7; 83/928; 50/379.5; 60/413, 414, 492

[56] References Cited

U.S. PATENT DOCUMENTS

| | | | |
|---|---|---|---|
| 1,851,156 | 5/1932 | Calahan | 144/208.1 |
| 3,156,276 | 11/1964 | Petrella et al. | 144/208.1 |
| 3,263,720 | 8/1966 | Brock et al. | 144/208.4 |
| 3,881,533 | 5/1975 | Savage et al. | 144/24.13 |
| 3,981,336 | 9/1976 | Levesque | 144/4.1 |
| 4,083,463 | 4/1978 | Ericsson | 144/34.1 |
| 4,194,542 | 3/1980 | Erikkson | 144/24.13 |
| 4,239,067 | 12/1980 | Mononen . | |
| 4,344,470 | 8/1982 | Dubey | 144/24.13 |
| 4,412,777 | 11/1983 | Forslune | 144/34.1 |
| 4,766,939 | 8/1988 | Forslund | 144/24.13 |
| 4,800,936 | 1/1989 | Pomies | 144/34.1 |
| 4,875,511 | 10/1989 | Wingate-Hill | 144/208.1 |
| 4,919,175 | 4/1990 | Samson | 144/24.13 |
| 4,989,652 | 2/1991 | Hansson | 144/34.1 |
| 5,111,860 | 5/1992 | Wingate-Hill | 144/208.1 |
| 5,219,010 | 6/1993 | Erikkson | 144/24.13 |
| 5,247,977 | 9/1993 | Munsey et al. | 144/208.1 |
| 5,501,257 | 3/1996 | Hickman | 144/34.1 |
| 5,524,685 | 6/1996 | Barnhill et al. | 144/208.1 |

FOREIGN PATENT DOCUMENTS

| | | | |
|---|---|---|---|
| 534473 | 2/1984 | Australia | A01G 23/08 |
| 553370 | 7/1986 | Australia | B66C 1/28 |
| 595302 | 3/1990 | Australia | A01G 23/00 |
| 599095 | 7/1990 | Australia | A01G 23/00 |

(List continued on next page.)

*Primary Examiner*—W. Donald Bray
*Attorney, Agent, or Firm*—Blake, Cassels & Graydon

[57] ABSTRACT

There is disclosed a workhead for timber processing, the workhead having a main body and a jaw assembly for grappling timber. The jaw assembly includes first and second cooperating pairs of jaw arms that are pivotally mounted to the main body. The first of the cooperating pairs of jaw arms provides cutting blades for delimbing. The workhead further includes a feed roller assembly for translating a felled tree through the cutting blades. First and second feed rollers of the feed roller assembly are associated with the jaw arms of the second cooperating pair of arms of the jaw assembly. A third feed roller is provided on the main body for pivotal movement relative to the main body. The feed rollers also effect compression debarking of the felled tree as it is translated through the cutting blades. Each roller has projecting engaging bars which extend in a generally helical configuration along the outer surface of the roller and between its opposed terminal ends. Each of the engaging bars is spaced apart from an adjacent engaging bar in a substantially parallel relationship, and the engaging bar has a contacting edge to engage the surface of the tree, with the contacting edge providing blunt longitudinally extending projections along its length. Also disclosed is a fluid delivery system having a swivel hydraulic manifold in combination with a fixed hydraulic manifold attached to the main body of the workhead. The workhead is capable of various timber processing operations, such as felling, grappling, bunching, shovel-logging, loading, debarking, delimbing and bucking.

29 Claims, 14 Drawing Sheets

FOREIGN PATENT DOCUMENTS

| | | | |
|---|---|---|---|
| 7640991 | 5/1991 | Australia | A01G 23/095 |
| 618679 | 1/1992 | Australia | A01G 3/08 |
| 620047 | 2/1992 | Australia | B27L 1/04 |
| 2963692 | 11/1992 | Australia | A01G 23/095 |
| 631864 | 12/1992 | Australia | A01B 35/22 |
| 641642 | 9/1993 | Australia | B23D 17/06 |
| 1083016 | 8/1980 | Canada | A01G 23/00 |
| 946458 | 7/1982 | U.S.S.R. | A01G 23/08 |
| 1444150 | 12/1988 | U.S.S.R. | 144/287 |
| PCT/SE8800338 | 12/1988 | WIPO | A01G 23/08 |
| PCT/SE9000042 | 7/1990 | WIPO | A01G 23/091 |
| PCT/FI9000147 | 12/1990 | WIPO | A01G 23/083 |
| PCT/SE9100606 | 4/1992 | WIPO | A01G 23/091 |
| PCT/FI9200027 | 9/1992 | WIPO | A01G 23/095 |
| PCT/FI920027 | 3/1993 | WIPO | A01G 23/095 |
| PCT/SE9300601 | 1/1995 | WIPO | A01G 23/093 |

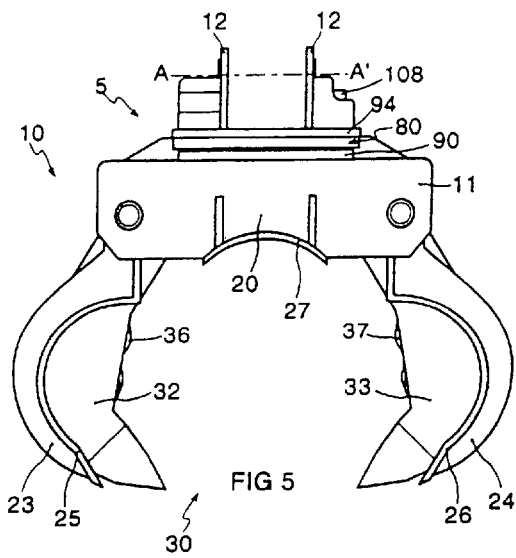
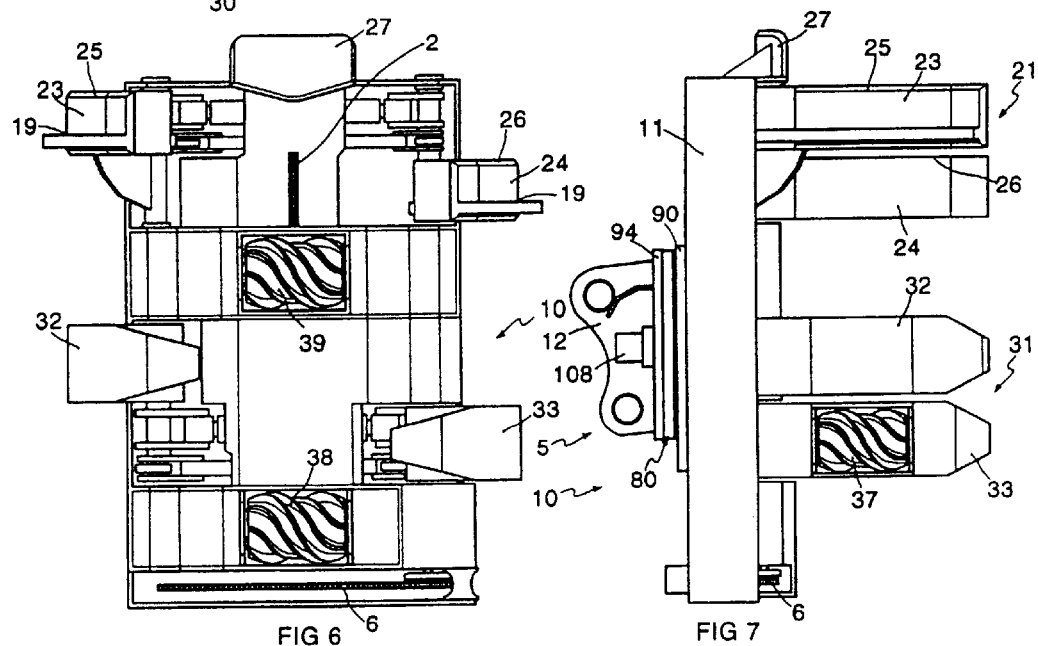

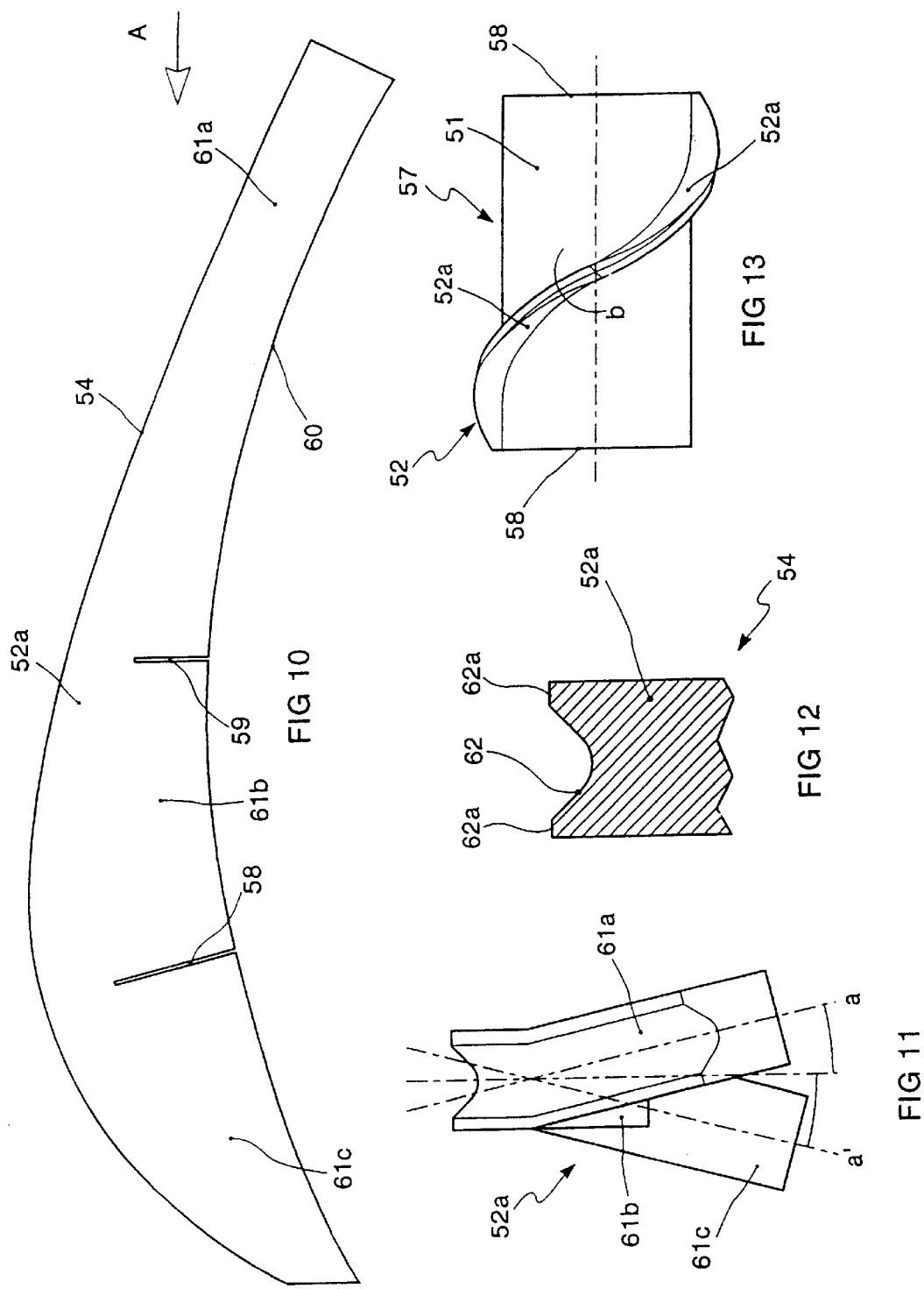

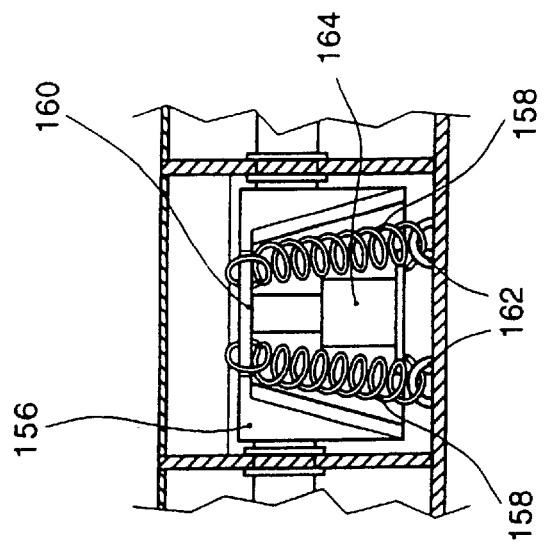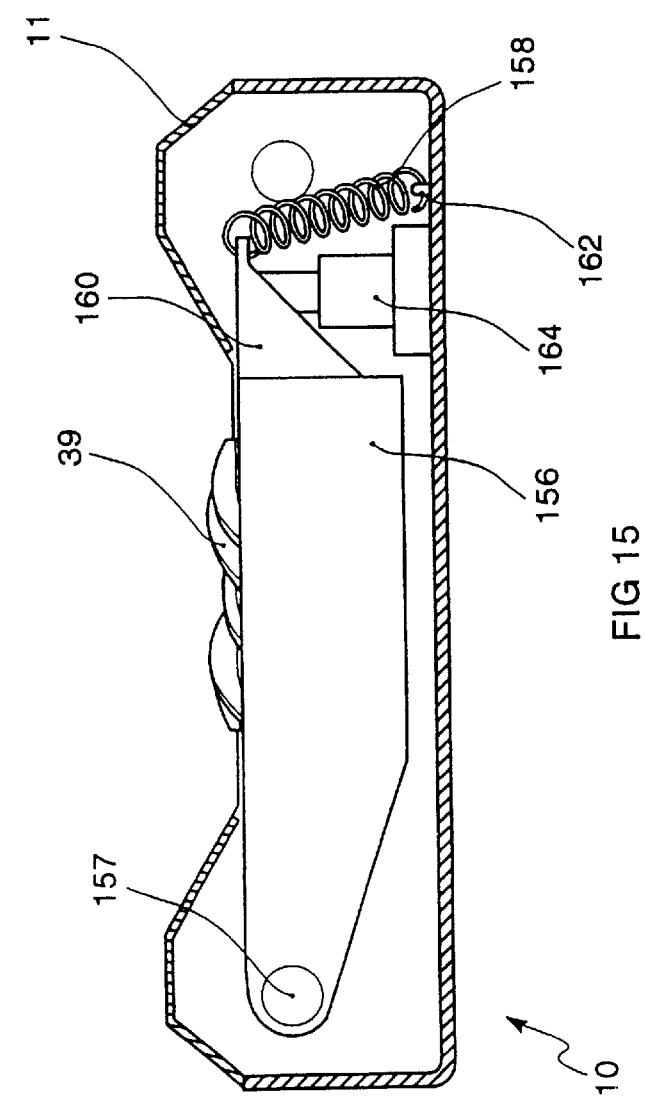

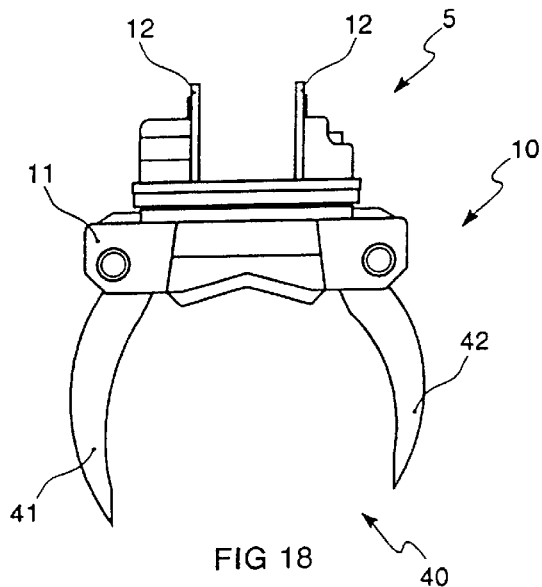
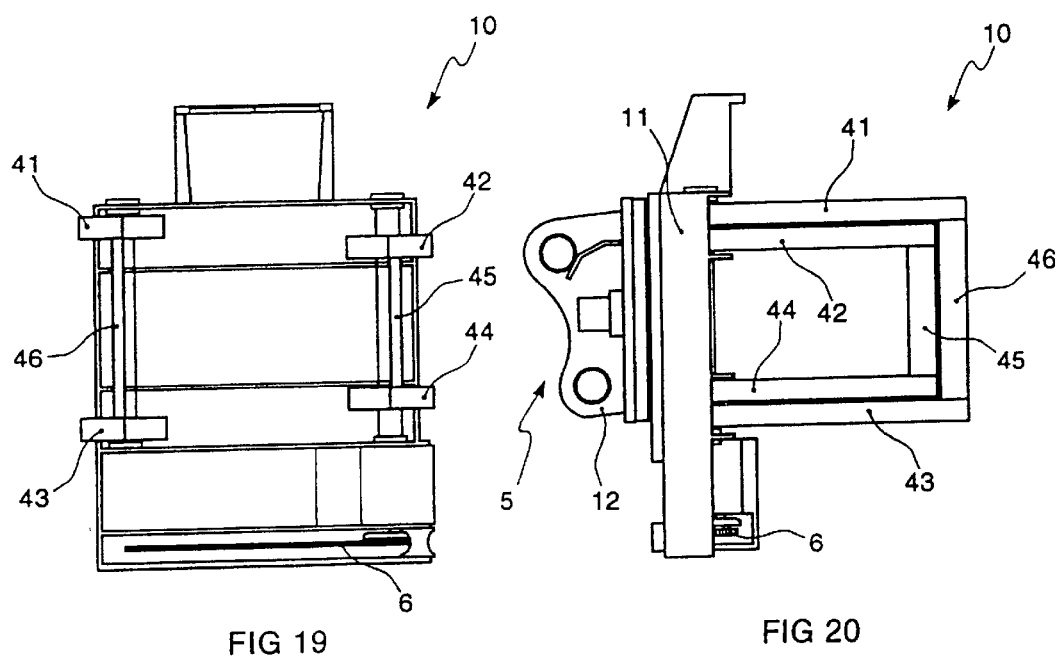

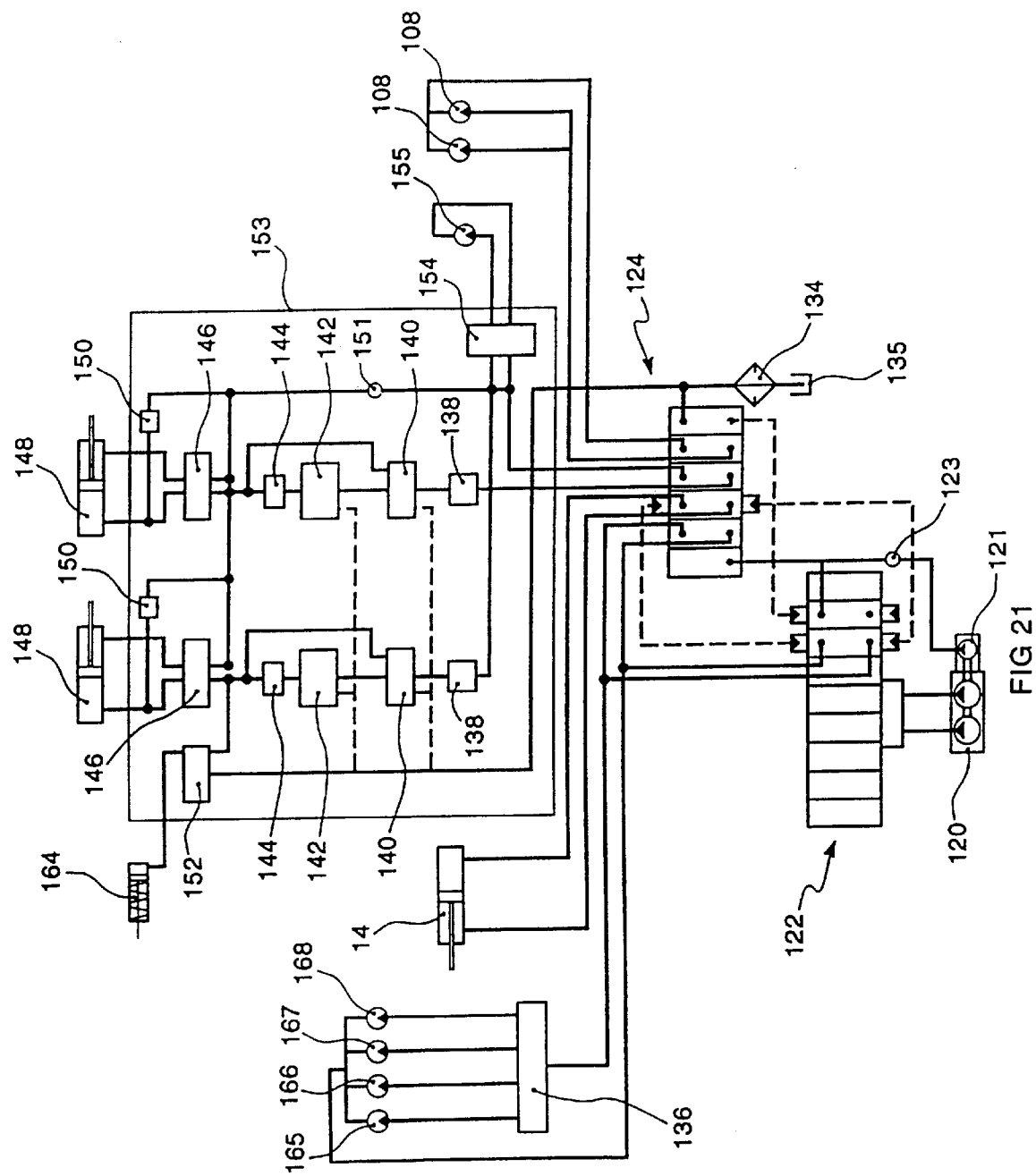

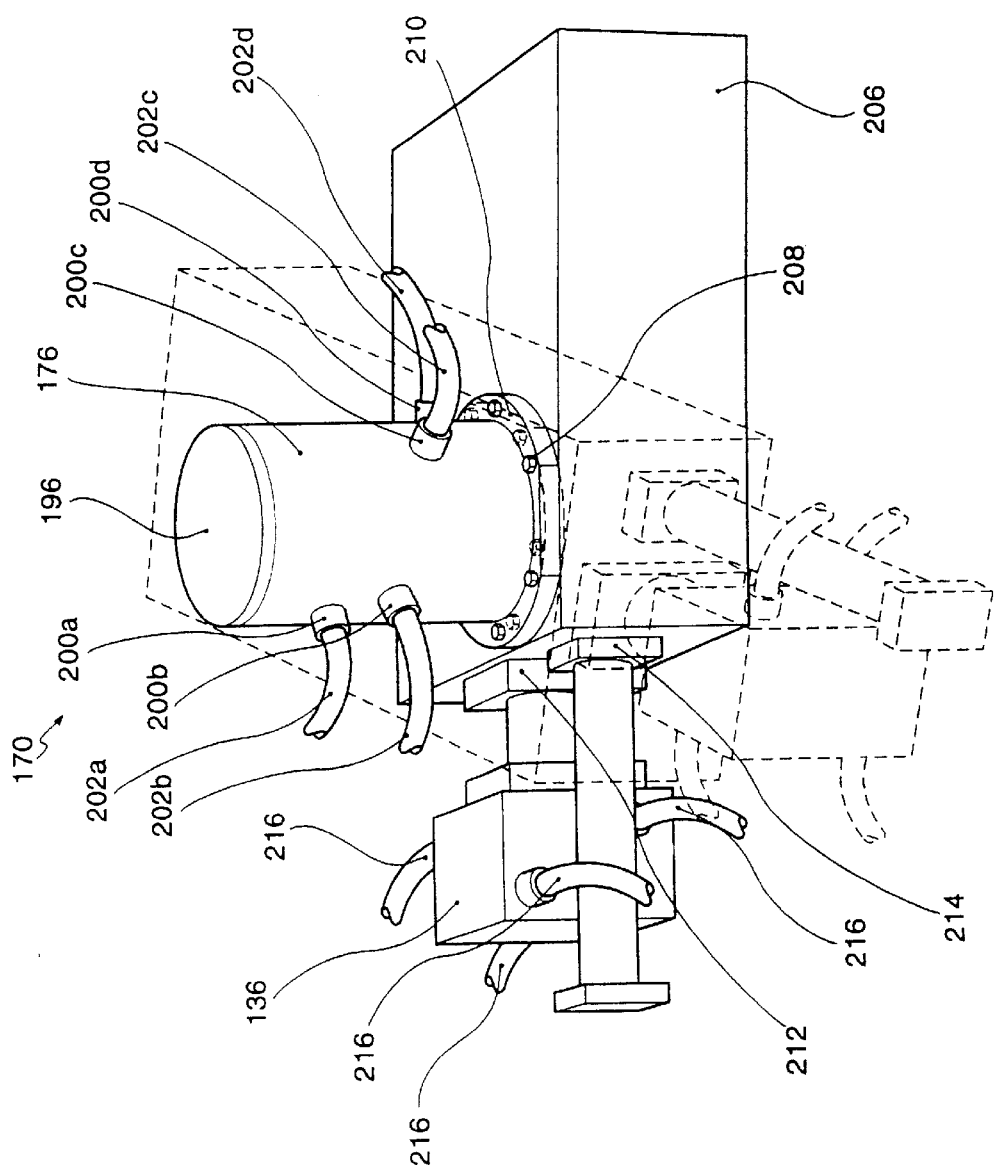

WORKHEAD FOR TIMBER PROCESSING

This application is a division of copending U.S. Ser. No. 08/653,342, filed on May 24, 1996.

FIELD OF THE INVENTION

The present invention relates generally to an apparatus for timber processing and more particularly, to a timber processing workhead suitable for use in various processing operations such as the harvesting, debarking and carriage of trees.

BACKGROUND OF THE INVENTION

There are currently a number of known workheads used in forestry which are each specifically designed for one or more particular functions involved in timber processing. For example, there are certain workheads which are adapted for use in the felling of trees, others for removing the bark or for removing the limbs from felled trees, others for the "bucking" or cutting of felled trees to length, and yet others for the loading or carriage of processed logs into storage regions or onto transport vehicles. It is also often necessary to design such workheads so that they are specifically capable of use with either hardwood or softwood, or particular tree species.

An example of a prior art timber processing device specifically adapted for tree felling is provided by International Application No. PCT/SE93/00601, published on Jan. 12, 1995 in the name of Widegren. The device according to Widegren includes a pair of shearing elements together with a sawing device, so as to effect tree felling either by sawing or shearing. Another dedicated cutting and sawing unit is exemplified by International Application No. PCT/SE91/00606, published on Apr. 2, 1992 in the name of Jansson. The unit according to Jansson includes a saw rotatably mounted on a motor stand and knives which project from a hub part of the saw. The knives co-act with a toothed device on the motor stand, such as to obtain a cutting action in addition to a sawing action.

Devices intended for dedicated tree delimbing are exemplified by the teachings of Australian Patent Application No. 76409/91, published on Nov. 14, 1991 and identifying Wingate-Hill et al. as inventors, Australian Patent Application No. 29636/92 published on Nov. 26, 1992 in the name of Milbourn, and Australian Patent No. 618,679 granted Jan. 2, 1992 in the name of Milbourn. The Wingate-Hill et al. device comprises a milling head having helical cutters, the milling head being mounted on support means such that the axis of rotation of the head is substantially parallel to the longitudinal axis of the trunk or log being delimbed. The first Milbourn device mentioned above consists of a workhead housing having a circular cutter wheel mounted thereon to rotate about a vertical axis. A chain saw is mounted by a swivel device on the housing and above the wheel. The second-mentioned Milbourn device consists of a workhead mounted on an articulated boom that can move vertically along a tree to trim the branches thereof.

Some known timber processing workheads provide a debarking roller assembly which engages the trunk of a felled tree and is configured so that when the rollers are activated, the trunk is drawn between the roller assembly. By their compressive action against the trunk, the rollers of the assembly cause the tree bark to loosen or separate from the truck, thereby at least partially debarking the trunk of the tree. This technique of timber debarking is known to those skilled in the art as compression debarking. Because of the nature or construction of compression debarking rollers currently in use, the debarking capability of some such rollers is limited. This deficiency may require supplementing the debarking action of the rollers, for instance by providing fixed or rotating knife edges to cut through bark which becomes loosened from the tree trunk, but which is not entirely removed by the rollers, or by arranging as many as six compression debarking rollers in an apparatus to ensure adequate circumferential coverage of a tree trunk drawn therebetween.

An example of a prior art debarking apparatus is found in U.S. Pat. No. 4,875,511, issued on Oct. 24, 1989 in the names of Wingate-Hill et al. This patent teaches the use of a plurality of pairs of concave rollers which are mounted in a spaced apart configuration along the linear passage of the log through the apparatus. The rollers in each pair have respective axes of rotation substantially parallel to each other. One pair of rollers is grooved or otherwise roughened or provided with welded-on bars, spikes or the like for gripping the surface of the timber being debarked, and for compressing the timber and bark such that the bark remains as a tube of enlarged section around the body of the tree. A second pair of rollers, including one or more knife blades, is provided downstream of the first pair of rollers, the second pair of rollers being arranged with their axes of rotation substantially perpendicular to the first pair of rollers. In another embodiment according to Wingate-Hill et al., a total of six rollers arranged in three pairs is provided, each pair having parallel axes of rotation substantially at 60° relative to the respective axes of the rollers in each other pair. The Wingate-Hill et al. patent teaches that unless separate bark cutting means are provided, each of the six rollers will have respective blades attached to or formed on their outer surfaces. Another example of a debarking apparatus providing compression rollers, with circumferential knives on their outer surfaces to cut through loosened bark, is found in U.S. Pat. No. 5,111,860 issued on May 12, 1992 and also in the names of Wingate-Hill et al.

Some prior art devices do combine several tree processing operations, such as felling and bucking, delimbing and bucking, or felling, delimbing and bucking. Examples of prior art devices intended for various combined operations of tree felling, bucking or delimbing are found in U.S. Pat. No. 3,981,336 issued on Sep. 21, 1976 in the name of Levesque, Soviet Patent No. 946,458 issued on Jul. 30, 1982 in the names of Samodov et al., and International Application No. PCT/SE88/00338 published on Dec. 29, 1988, and identifying Westlund as the inventor thereof. The Levesque device comprises a harvester head having a cutting mechanism consisting of a pair of shear-like cutting edges and delimbing knives mounted to a support member. The head can be positioned vertically by a boom against a tree to be severed and then rotated into a horizontal position for the delimbing and further severing of the tree into bolts. The Soviet device mentioned above consists of a jib mounted onto a turnable, the jib providing drive rollers for translating a tree trunk through branch stripping blades. A saw attachment for felling trees may also be provided at the terminal end of the jib. As for the Westlund device, it consists of a delimbing tool having knives and a gripper which are moveable relative to one another in the axial direction of a trunk located in the gripper, such as to delimb the trunk as it is translated. A pivotable saw attachment is provided for felling and bucking of timber. None of these combined processing devices provides integrated means for debarking the processed timber.

An example of a prior art device which is intended for the combined functions tree felling and bucking is found in International Application No. PCT/SE90/00042 published on Jul. 26, 1990 and identifying Keller as the inventor thereof. The harvester according to Keller provides for two pairs of grapple arms, a feeding device in the form of a driving belt or driving wheel, and a cutting device having a pivotable guide bar around which a saw chain is rotatable at high speed. The grapple arms of Keller serve to seize the tree trunk and to delimb the trunk as it is longitudinally fed through the harvester by the feeding device. The Keller device does not provide for a debarking function.

Other devices providing for various combined tree processing functions are found in U.S. Pat. Nos. 4,194,542 and 5,219,010 issued respectively on Mar. 25, 1980 and Jun. 15, 1993, each in the name of Eriksson, U.S. Pat. No. 4,766,939 issued on Aug. 30, 1988 in the name of Forslund, and International Applications Nos. PCT/FI92/00027 and PCT/FI92/00227 published respectively on Sep. 3, 1992 and Mar. 4, 1993, each in the name of Moisio. The Eriksson patents disclose tree processing devices which include cooperating grabbing arms or delimbing members, drive rollers to feed the tree through the devices and a pivotable severing device to cut the tree. The first-mentioned Eriksson patent provides a device wherein the drive rollers are arranged on the grabbing arms in order to follow the grabbing arms towards and away from a tree. The Forslund device comprises cooperating jaw arms, feeding units for the trunk and delimbing tools moveable with the feeding units in a common plane. The Moisio devices have cooperating grapple arms, drive rollers for the trunk and articulating delimbing cutters. None of the foregoing devices provides for the capability to debark a tree being processed.

Yet other devices providing for various combined tree processing functions are found in International Application No. PCT/FI90/00147 published on Dec. 13, 1990 in the name of Ketonen, and Australian Patent No. 534,473 issued on Feb. 2, 1984 in the names of Barnett et al. The Ketonen apparatus consists of a frame, two feed tracks disposed opposite one another for translating a tree, front and rear stripping blades for delimbing, and a pivotable saw for cutting bolts to length. The Australian patent to Barnett et al. discloses a head member for tree processing which includes delimbing means, a clasping arrangement of arm members and a pair of shear knives for felling of a tree. As the head member according to Barnett et al. is caused to gravitate down a tree to its base, the momentum of the head member during the downward movement is such as to cause delimbing of the tree. The same patent also teaches that the clasping arrangement of the arm members provides for removal of at least some of the bark from the tree during its delimbing.

Many workheads of these known types are typically adapted for use with machines having a boom or beam to which the workhead is securable. Generally, workheads which are used in tree felling and processing operations are secured to a boom through an uncoupled grapple or swinging link, known in the art as a dangle connection. For instance, Canadian Patent No. 1,083,016, issued on Aug. 5, 1980 in the name of Hagan, teaches a delimbing and loading head which is articulated on the end of an arm by means of a universal joint. The joint is connected to the head at approximately its center of gravity so that it can swivel freely on two axes and automatically remain in a substantially horizontal position throughout delimbing and loading operations. Such prior art links provide for limited control of the processing head during a felling operation. Other prior art links, while providing for enhanced control of the workhead, may not achieve an appropriate range of motion for the workhead in all required directions of movement. Yet other prior art connections do not provide for ready maintenance access to electrical or hydraulic control lines, or may not be configured in a compact design.

It is therefore an object of the present invention to provide a timber processing workhead which is intended to alleviate or overcome one or more of the aforementioned disadvantages or problems associated with known timber processing workheads.

It is another object of the present invention to provide a versatile processing workhead which may serve in a plurality of timber processing functions, such as felling, delimbing, debarking, bucking, carriage and loading of trees.

It is a further object in another aspect of the present invention to provide a feed roller for use in a feed roller assembly of a timber processing workhead, which feed roller is also suited for compression debarking of felled timber.

It is a further object in another aspect of the present invention to provide a rotatable and pivotable coupled wrist connection between a processing workhead and a beam or boom to which it is connected, which is intended to provide an appropriate range of motion and a sufficient degree of control for the workhead operator involved in various timber processing activities.

It is a yet further object of the present invention to provide the rotatable and pivotable coupled wrist connection of the kind mentioned above, wherein the connection is associated with a fluid delivery manifold that is configured in a relatively compact design, and which is intended to provide for a sufficient degree of access to electrical and hydraulic control lines for maintenance purposes.

BRIEF DESCRIPTION OF THE INVENTION

According to one broad aspect of the present invention, there is provided a workhead for timber processing, the workhead comprising:

(a) a main body;

(b) mounting means for attachment of the main body to a support structure;

(c) wrist means for pivotal movement of the main body relative to the support structure about a pivot axis and for slewing movement of the main body relative to the support structure about a slew axis;

(d) hydraulically powered timber processing means provided with the main body;

(e) fluid delivery means for supplying hydraulic fluid to the powered timber processing means, the fluid delivery means comprising a swivel hydraulic manifold extending externally of the main body along the slew axis and a fixed hydraulic manifold attached to the main body, the swivel manifold comprising a substantially cylindrical rotor portion and a corresponding sleeve portion in sealed rotational engagement therewith, the rotor portion being attached to the fixed manifold, the sleeve portion providing a fluid inlet port and the rotor portion providing a corresponding fluid receiving channel disposed circumferentially along an outer surface thereof, the fluid receiving channel being in constant fluid communication with the fluid inlet port of the sleeve portion throughout relative rotational movement of the rotor portion and the sleeve portion, the fluid receiving channel being in fluid communication with a corresponding fluid through passage provided in the fixed manifold, the fixed manifold providing an outlet port on an external surface thereof in fluid communication with the fluid through passage thereof; and wherein the outlet port of the fixed manifold supplies hydraulic fluid received from the inlet port of the swivel manifold to the powered timber processing means of the main body of the workhead.

According to another broad aspect of the present invention, there is provided a feed roller for use in timber processing for compressive removal of bark from a felled tree, the feed roller comprising:

(a) a base portion providing a cylindrical outer surface and opposed terminal ends, the base portion being rotatable about a longitudinal axis thereof; and (b) a plurality of engaging means for engaging the surface of timber, the engaging means projecting generally radially from the base portion and extending along the outer surface thereof between the opposed terminal ends of the base portion in a generally helical configuration, each engaging means being spaced apart from an adjacent engaging means in a substantially parallel relationship with respect thereto, each engaging means having a contacting edge to engage the surface of timber, the contacting edge providing blunt longitudinally extending projections thereon.

According to yet another broad aspect of the present invention, there is provided a workhead for timber processing, the workhead comprising:

(a) a main body;

(b) a jaw assembly for grappling timber, the jaw assembly including first and second cooperating pairs of jaw arms, the jaw arms each having a free end and a connected end, the connected ends of the jaw arms each being pivotally mounted to the main body for relative movement of the jaw arms of each cooperating pair between an operative position, wherein the free ends of the jaw arms thereof are brought towards each other to grapple timber therebetween, and a release position, wherein the free ends of the jaw arms thereof are spaced apart from each other to surrender said timber, a jaw arm in each cooperating pair of jaw arms being mounted adjacent a jaw arm of the other cooperating pair along the same side of the main body of the workhead;

(c) a timber delimbing means associated with the first cooperating pair of jaw arms, the timber delimbing means comprising cutting blades provided respectively on each of the jaw arms thereof; and (d) a feed roller assembly having: a plurality of feed rollers driven in cooperative rotation for translating a felled tree along a longitudinal axis thereof through the delimbing means when the jaw arms thereof are actuated to the operative position to encircle the felled tree about its circumference, the cutting blades being positioned on the jaw arms of the delimbing means to effect delimbing of the felled tree as it is axially translated therethrough; first and second feed rollers of the feed roller assembly each being associated with the respective jaw arms of the second cooperating pair of jaw arms of the jaw assembly, the first and second feed rollers each engaging the felled tree when the jaw arms associated therewith are actuated to the operative position, the feed rollers each having a respective axis of rotation substantially parallel to respective planes of pivotal motion corresponding to the jaw arms associated therewith; and a third feed roller of the feed roller assembly being rotatably mounted on the main body, for pivotal movement relative thereto, between an operative position wherein the third feed roller engages a tree trunk being grappled by the jaw assembly and a retracted position wherein the third feed roller disengages the tree trunk.

With reference to preferred embodiments of the present invention, there is provided a workhead suitable for use with an apparatus having a beam or boom operatively connected to a support or carriage, the workhead comprising a main body, mounting means operatively connected to the main body for attaching the workhead to the beam or boom, coupling means for permitting pivotal movement of the workhead about a pivot axis relative to the boom, slewing means for permitting rotation of the main body about a slew axis, the pivotal movement about the pivot axis and the rotational movement about the slew axis permitting at least limited universal movement of the main body relative to the beam or boom when the workhead is operatively connected thereto, and a jaw assembly comprising at least two cooperating jaw arms which are each pivotally mounted to the main body for movement between an operative position and a release position.

When in use in the operative position, the jaw arms are adapted to hold or engage one or more tree trunks therebetween, and in the release position, the jaw arms are spaced apart relative to one another to release any tree trunks held when the jaw arms are previously in the operative position.

According to one particular embodiment of the present invention, the workhead is adapted to perform a series of varied processing operations. According to another particular embodiment of the invention, the workhead is adapted for a lifting and carrying function. For example, in the first mentioned embodiment, the processing head may be able to perform two or more of the following operations: it may be adapted to grip the tree during the felling operation and be capable of lowering it to the ground; it may be adapted to remove the bark from the felled tree; it may be adapted to remove limbs from the felled tree; it may be adapted to cut to a selected length the trunk of the tree; and/or it may be adapted to load, deposit or carry the processed logs in or to a desired position, known to some skilled in this art as "hoe-chucking" or "shovel logging".

The main body of the workhead according to either of the aforementioned embodiments may be in the form of a support structure or frame to or by which the mounting means, coupling means, slewing means and a jaw assembly all may be operatively supported. The mounting means may be in the form of a bracket which is operatively connected by coupling means to the beam or boom of the support structure or carriage for the workhead.

The coupling means for operatively connecting the mounting bracket of the workhead to the beam or boom of the support structure or carriage includes an actuating means which is preferably in the form of a hydraulic actuator mechanism. One end of the actuator mechanism is connected to the boom and the other end is connected to a guide linkage mechanism for interconnecting of the boom and the bracket. The reciprocating motion of the actuator mechanism acting through the guide linkage mechanism will cause pivotal movement of the mounting bracket and thereby the main body of the workhead. Preferably, two guide links are provided, one being connected between the boom and the hydraulic actuator and the other being connected between the actuator and the bracket.

Preferably, the slewing means for the workhead comprises a slew bearing adapted to be disposed between the mounting bracket and the main body of the workhead. Drive means associated with the slew bearing are provided for causing rotation of the main body about the slew axis. Such drive means may be in the form of hydraulic motors, although it will be appreciated that other forms of drive means could be utilised for the slew bearing.

In the embodiment discussed above for which the workhead is particularly adapted as a lifting and carrying mechanism, the jaw assembly may comprise two sets of spaced apart cooperating jaw arms, each of the arms having one end pivotally connected to the main body so that the cooperating arms in each set can pivot towards or away from each other between respective operative and release positions. The jaw assembly may further include cross-members extending between respective adjacently disposed arms in each set.

In the embodiment referred to above for which the workhead is adapted to perform varied functions, the jaw assembly may comprise two sets of jaw members. One set of jaw members consists of a pair of cooperating jaw arms pivotally connected to the main body and having associated therewith a plurality of feed rollers which form part of a feed roller assembly. The feed rollers are each adapted and are preferably together configured to rotate and draw the tree trunk therebetween when the feed rollers are rotated. A second set of cooperating jaw arms may be provided, the second set being arranged in a spaced apart relationship to the first set. The arms of the second set have delimbing means thereon, for instance blade sections with knife edges, so that in their operative position and when the tree is translated through the jaws by the feed roller assembly, the blade sections with knife edges are positioned to remove limbs from the tree trunk. A delimbing knife may also be provided in the main body of the workhead to provide for greater circumferential coverage of a trunk during its delimbing by the second set of arms of the workhead.

The feed roller assembly may further include one or more additional rollers located in the main body of the workhead, which are adapted to cooperate with the feed rollers in the jaw arms to define the feed roller assembly. There is at least a single feed roller mounted in the body of the head. Preferably, this feed roller is a retractable cushion roller mounted on a swinging arm which may, for example, be controlled by a hydraulic actuator. When the workhead is in its processing mode, the hydraulic actuator is activated and the cushion roller is pushed forward to engage the log. During all other modes of operation, the hydraulic actuator is not activated and the cushion roller remains in a retracted position. The purpose of retracting this feed roller is that during felling, the tree will be in contact only with the feed rollers on the arms and with portions of the main body of the head, such as the delimbing knife provided thereon. This ensures maximum clamping stability during felling as well as when handling processed logs, such as when timber is being carried or loaded onto a transport vehicle. Additionally, a relief valve may be provided in the hydraulic supply line for the hydraulic actuator which activates the swinging arm of the cushion roller. The relief valve may be set to a preselected pressure so as to reduce the supply of hydraulic fluid to the swinging arm actuator in the event of excessive radial load to the roller, for instance, as may occur during the processing of crooked trees.

The processing head may further include a severing means such as a saw attachment which may be pivotally mounted to the main body. In operation, the saw attachment can be pivoted in order to cut across the trunk of a tree or log, for felling or bucking purposes. Other severing means may be adapted for use with the workhead according to the present invention, as will be apparent to those skilled in this art.

A measuring device may be provided with the processing workhead to measure the length of logs to be cut. The measuring device may be mounted on a mechanism forming part of the main body which allows the measuring device to be held in a protruding position whilst in a processing mode. During all other modes of operation, the measuring device is in a retracted position to avoid damage. Preferably, the measuring device is resiliently mounted on the main body to accommodate dimensional variances and surface discontinuities encountered along the length of processed logs. Those skilled in this art will appreciate that other measuring devices may be incorporated for use with the workhead according to the present invention.

The particular design of the feed rollers for the workhead described above forms another aspect of the present invention. The design of the feed roller may permit it to be used in the debarking of a wide variety of tree species.

With reference to embodiments pertaining to this aspect of the present invention, there is provided a feed roller for use in a feed roller assembly of a processing workhead, the feed roller comprising a base section having a generally cylindrical outer surface, and a plurality of engaging bars which are secured to or formed integral with the outer surface to project generally radially therefrom. The engaging bars are spaced apart and generally parallel to one another, each engaging bar extending in a generally spiral configuration from one end of the feed roller base section to the other.

Preferably, each of the engaging bars is of greater height dimension towards the end portions of the base section of the feed roller, and is arranged to taper inwardly as the bar approaches an intermediate portion thereof. The outer edges of each of the bars, taken along a parallel plane running between the end portions of the base, trace a generally concave or fluted engaging edge. Furthermore, it is desirable that the top surface of the engaging bars, when viewed in longitudinal cross-section, be generally concave in shape so as to provide a generally concave envelope surface to the feed rollers.

Preferably, the feed rollers of the processing head are driven by a load sensing pressure compensated hydraulic system which is fitted with a flow dividing valve to give positive drive to all rollers under all conditions. As well, hydraulic fluid is supplied and returned through the workhead wrist connection via a combined swivel manifold and block manifold, which results in a compact design.

The processing workhead according to the present invention is capable of cutting a tree off its base, holding the felled tree in an upright position, moving the tree while in this position to various other desired positions, and lowering or raising the tree in numerous desired directions. Such manipulation of a felled tree may be made prior to, during or after delimbing, debarking and bucking of the tree by the processing workhead. In addition, the processing workhead is also advantageously capable of grappling, bunching, shovel-logging and loading a plurality of processed logs.

BRIEF DESCRIPTION OF THE DRAWINGS

For purposes of illustration and understanding of the invention, but not of limitation, reference will be made to the following drawings in describing various aspects and embodiments of the present invention, in which:

FIG. 5 is an end elevation of the timber processing workhead according to the embodiment of the present invention shown in FIG. 1;

FIG. 6 is an underside plan view of the workhead of FIG. 1;

FIG. 7 is a side elevation of the workhead of FIG. 1;

FIG. 10 is a side elevation of a portion of an engaging bar which forms part of the feed roller according to the present invention;

FIG. 11 is an end elevation of the working bar portion of FIG. 10, viewed along direction "A" of FIG. 10;

FIG. 12 is a partial cross-sectional view of the fluted outside edge of the working bar of FIG. 10;

FIG. 13 is a schematic side elevation of two engaging bar portions of FIG. 11, showing their helical placement along the outer surface of a feed roller according to the present invention;

FIG. 15 is a partial cross-sectional end view of a retractable cushion roller assembly located in the main body of the workhead according to FIG. 1;

FIG. 16 is a partial cross-sectional side view of the cushion roller assembly of FIG. 15;

FIG. 18 is a schematic end elevation of the workhead according to a second embodiment of the present invention;

FIG. 19 is a schematic underside plan view of the workhead shown in FIG. 18;

FIG. 20 is a schematic side elevation of the workhead of FIG. 18;

FIG. 21 is a schematic layout of a hydraulic circuit adapted for operating and controlling the various powered devices of the workhead according to FIG. 1;

FIG. 26 is a schematic perspective view of the manifolds of FIG. 25, showing the relative slewing movement thereof.

DETAILED DESCRIPTION OF PREFERRED EMBODIMENTS

Figure 1:
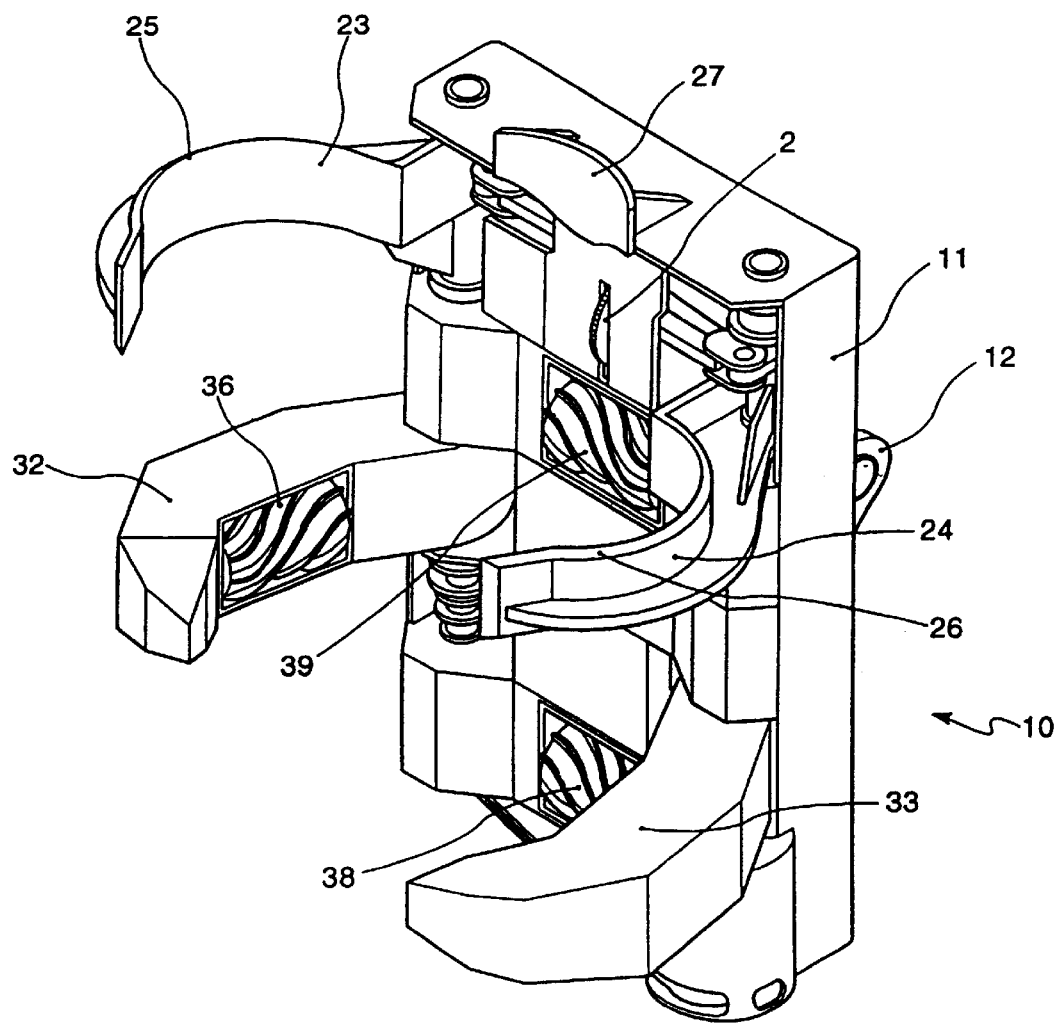
FIG. 1 is a schematic perspective view of a timber processing workhead according to a first embodiment of the present invention.

With particular reference to FIG. 1 and FIGS. 5 to 7, the timber processing workhead 10 according to a first embodiment of the present invention includes a main body 11 and a wrist connection 5 which permits at least limited universal movement of the main body of the workhead relative to a boom 71 or other support member thereof. This particular embodiment of the invention is intended to be suitable for carrying out a variety of timber processing operations, including controlled felling, delimbing, debarking, bucking, carriage, and transporting from one site to another. The main body 11 of the workhead 10 is preferably in the form of a support structure or frame to or by which the wrist connection 5, a jaw assembly 30 consisting of two pairs of cooperating jaw arms 21 and 31, and timber feed means in the form of driven feed rollers 36 to 39 are operatively supported. Details of the specific features of workheads according to various embodiments of the present invention are explained more clearly herebelow with reference to FIGS. 5 to 7 and FIGS. 18 to 20.

Figure 2:
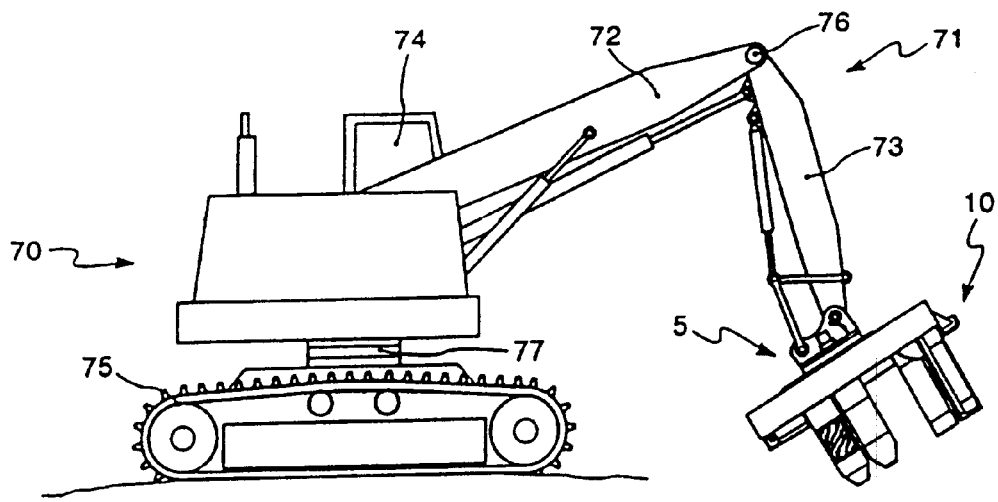
FIG. 2 is a side elevation of the workhead according to the present invention, being operatively connected to the articulated boom of an associated all-terrain vehicle.
Figure 3:
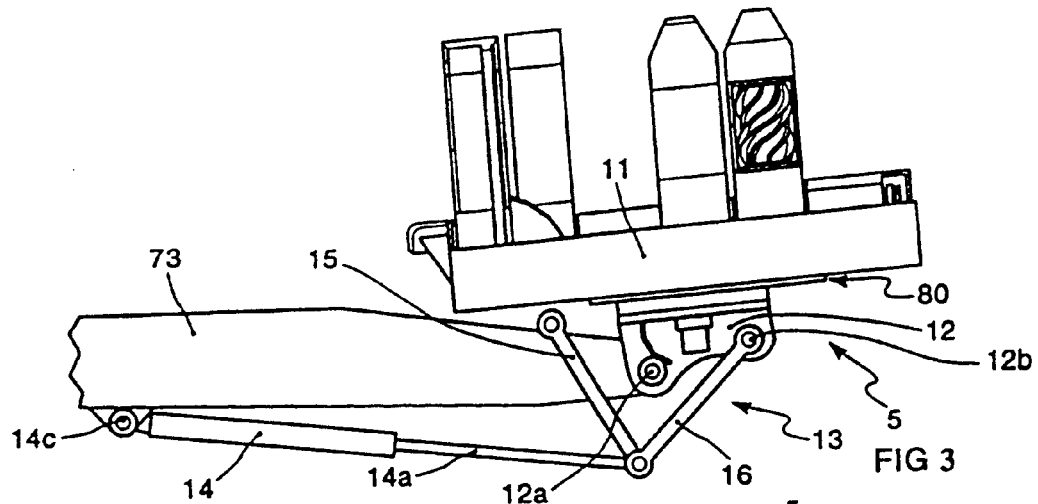
FIG. 3 is a detail of the coupling mechanism by which the workhead is coupled to the vehicle boom of FIG. 2, showing a hydraulic actuator of the boom in a fully extended stroke position.
Figure 4:
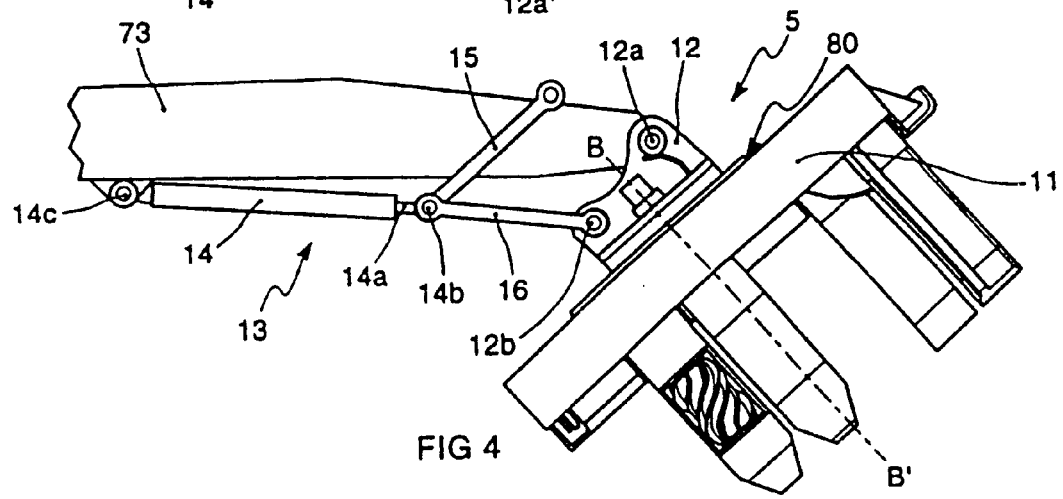
FIG. 4 is a similar view to FIG. 3, with the hydraulic actuator of the coupling mechanism being shown in a fully retracted stroke position.
Figure 8:
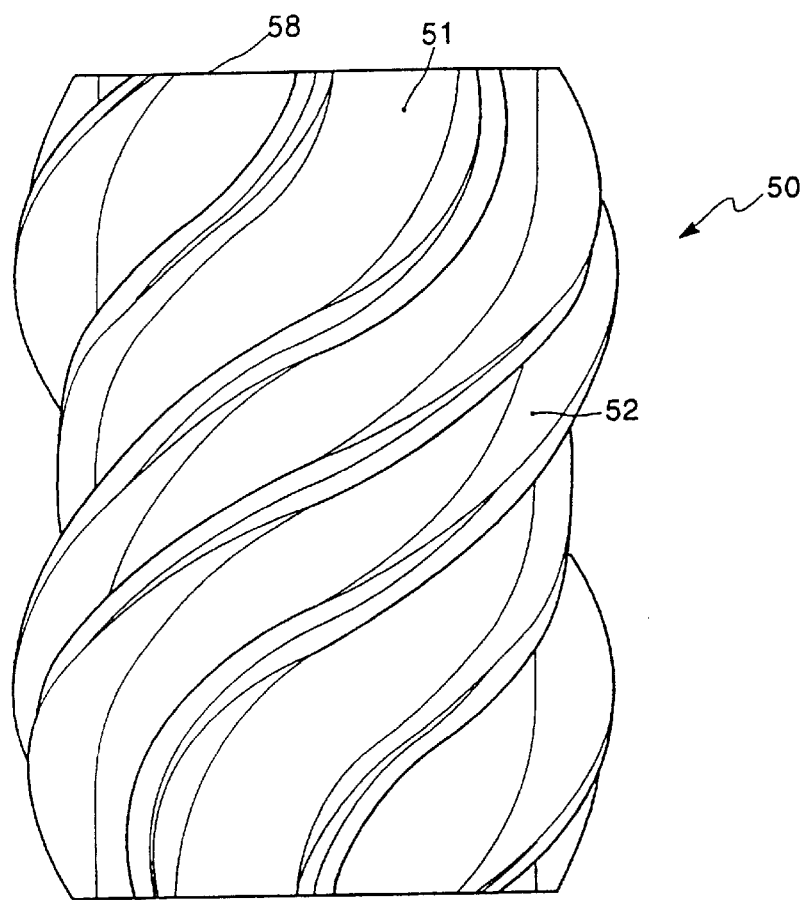
FIG. 8 is a side elevation of a feed roller according to another aspect of the present invention.
Figure 9:
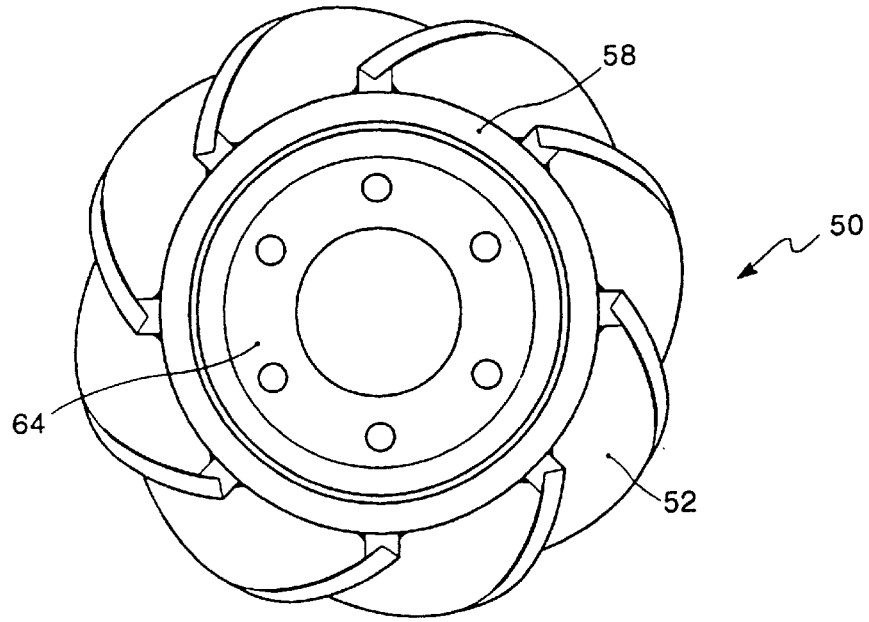
FIG. 9 is an end elevation of the roller shown in FIG. 8.

Referring now to FIGS. 2 to 4, the timber processing workhead 10 according to the present invention is shown connected to an articulated boomset 71 of an associated all-terrain vehicle 70 of the kind well known to those skilled in this art. As shown in FIG. 2, the boomset 71 is pivotally supported by the vehicle 70, the boomset having an inner section 72 and an outer section 73, the inner and outer sections being capable of pivotal movement relative to one another about a pivot connection as at 76. The vehicle further includes an operator cabin 74, an endless track drive system 75 and a slewing ring 77, also well known to those skilled in this art.

The wrist connection 5 of the workhead comprises a mounting bracket 12 to which is connected a coup ling means 13 f or pivotal motion of the workhead, as explained below. The workhead is pivotally connected, as at 12a, by means of the mounting bracket 12 at the terminal end of outer section 73 of boomset 71. Coupling means 13 for the workhead comprises an actuator means, which is preferably a hydr auli c actuator mech anism 14 well known to those skilled in this art. The actuator 14 is pivotaly mounted at its cylinder end to outer section 73 of boomset 71, as at 14c. The coupling means further includes a pair of guide links 15 and 16, each of which have an end thereof pivotally connected, as at 14b, to the terminal end of ram 14a of the actuator 14. The end of guide link 15 opposite the actuator ram 14a is pivotally connected to the terminal end of outer section 73 of boom 71 adjacent the mounting bracket 12, as at 73a. The end of guide link 16 opposite the actuator koram 14a is pivotally connected to the mounting bracket 12, as at 12b.

The coupling means 13 operatively connect the workhead to the boom 71 so that it can pivot about an axis extending through pivot connection 12a, denoted as AA' in FIG. 5. The configuration of t he coupling means 13 with the hydraulic actuator 14 placed beneath the outer section 73 of boom 71, rather than above, advantageously results in the actuator being in a state of compression during many timber handling manoeuvres in which gravity will contribute to additional dynamic loading of the actuator mechanism, such as in timber handling operations.

The wrist connection 5 of workhead 10 also includes a slewing means, preferably in the form of a slew bearing 80 which is disposed between the main body 11 and the mounting bracket 12. Drive means associated with the slew bearing, preferably in the form of twin reversible hydraulic motors 108, cause rotation of main body 11 about a slew axis, denoted as BB' in FIG. 4. Together, the operation of the coupling means 13 and slew bearing 80 provide for an appropriate degree of universal movement of the main body relative to boom 71, as previously mentioned. Details concerning the features and operation of slew bearing 80 are provided herebelow.

Turning more specifically to FIGS. 5 to 7, the jaw assembly 30 of the workhead 10 comprises two sets of jaw members or arms 21 and 31. As will be best noted in FIGS. 6 and 7, the jaw arms of each set are slightly off-set with respect to one another. The first set of jaw arms 31 comprises two cooperating arms 32, 33 which again are arcuate in shape and are mounted for pivotal movement relative to the main body 11 of the workhead. Each arm 32, 33 has a feed roller 36, 37 attached thereto, these rollers forming part of a feed roller assembly. The feed roller assembly further includes a pair of rollers 38 and 39 which are disposed in the main body of the workhead. All of the feed rollers are configured so that when activated, they will translate and cause rotation of the tree trunk as it passes between the rollers. The feed rollers are described in greater detail herebelow, and effect compression debarking of a tree truck processed by the workhead 10.

The second set of jaw arms 21, which are disposed upstream with respect to the direction of travel of a tree trunk through the jaw assembly during delimbing, comprises two cooperating arms 23 and 24, which are also generally arcuate in shape and mounted for pivotal movement towards or away from one another. Each of these arms has a blade section with knife edges 25, 26 associated therewith, which can trim limbs from the tree trunk as it is translated through the jaw members 21 by the feed roller assembly. The arms 23, 24 provide flat surfaces 19 (FIG. 6) thereon which trail the knife edges of the blade sections. However, those skilled in this art will appreciate that the surfaces 19 may be sloped outwardly away from the knife edges, if desired, so as to prevent any accumulation of wood chips, branches or other cut material produced by the delimbing action of the arms.

Each set of jaw aims 21 and 31 may be independently activated into a closed operative position, wherein the free ends of the arms are brought towards each other, or into an open release position, wherein the arm ends are brought away from one another. Each set of jaw arms 21 and 31 is activated by a separate actuating means, preferably in the form of a hydraulic actuator 148 (shown schematically in FIG. 18) well known to those skilled in this art.

A knife 27 is mounted on the main body 11 of the workhead to provide a more complete circumferential coverage during delimbing together with the action of blade sections 25, 26. Those skilled in this art will appreciate that the knife 27 may be provided as a fixed knife or as a retractable and outwardly biased floating knife, as is well known. Area 20 of the main body (FIG. 5), which trails the cutting edge of knife 27, may be provided with a sloped deflecting surface (not shown) to prevent accumulation of cut material produced by the delimbing action of the knife. As well, a severing means in the form of a pivotally mounted hydraulic saw 6 is provided at one end of the main body for cutting processed logs to length and for tree felling.

Referring next to FIGS. 8 to 14, the feed roller 50 for use as a roller 36 to 39 of the workhead comprises a base section 57 having a cylindrical outer surface 51 and a plurality of engaging means in the form of engaging vanes or bars 52 attached to or formed integral with the outer surface of the base section to project generally radially therearound. The engaging bars are adapted to extend from one end surface 58 of the roller to the other in a generally spiral or helical configuration, such that each engaging bar extends 180° around the circumference of outer surface 51, as best shown in FIG. 13. Each engaging bar 52 is preferably disposed on the outer surface 51 to form a helix angle of approximately 40° with respect to the longitudinal axis of the roller 50. Eight such engaging bars are preferably provided in an evenly spaced circumferential arrangement on each roller 50.

The engaging bars 52 may be formed from two bar portions 52a, placed end-to-end on the surface 51 of roller 50. Each bar portion 52a is generally arcuate in shape, and may be formed from a plate section provided with two thin slots 58, 59 through its cross-section. The slots are located adjacent the base edge 60 of the bar portion which is intended to attach to the outer surface 51 of roller 50. The slots 58, 59 may be formed in a plate section for bar portion 52a by means such as flame cutting, or other means known to those skilled in this art.

The provision of slots 58, 59 results in the bar portion 52a being divided into three sections, namely an inner section 61a, an intermediate section 61b and an outer section 61c, each being angularly disposed with respect to the other. The outer section 61c is located adjacent an end face 58 of the roller 50, when the bar portion 52a is attached to its outer surface 51. Intermediate section 61b is located between the thin slots 58, 59. The inner section 61a of the bar portion 52a is located between the end faces 58 of a roller 50 when bar portion 52a is attached to outer surface 51 thereof. As best shown in FIG. 11, inner section 61a extends from the bar portion at an angle a of approximately 15° with respect to intermediate section 61b. Likewise, outer section 61c of bar portion 52a extends angularly from the bar portion at an angle a' of approximately 15° with respect to the height dimension of intermediate section 61b of the bar. The angular relationship between each of the sections 61a, 61b and 61c of bar portion 52a may be obtained by bending of the sections once slots 58, 59 have been formed in the plate section for bar portion 52a. Other means of constructing or forming the bar portions will be apparent to those skilled in this art. As best shown in FIG. 10, bar portion 52a has a greater height dimension towards the end portion 61a, and is shaped to taper longitudinally to a lesser height dimension towards inner section 61a. When two bar portions 52a are placed end-to-end on the surface 51 of roller 50, this height tapering results in a generally concave envelope surface for the feed rollers 50 when viewed in longitudinal cross-section. The base edge 60 of bar portion 52a is fixedly attached to the outer surface 51 of roller 50 preferably by welded attachment. Other means for constructing the roller 50 and its engaging bars 52 will be apparent to those skilled in this art.

The outer or contacting edge 54 of the bar portion 52a is intended to engage a tree trunk and cause rotation thereof as it passes through the feed roller assembly of workhead 10. As best seen in FIG. 12, outer edge 54, when viewed along a plane parallel to the end portions 58 of base 57 of the roller 50, traces a fluted or concave engaging edge 62 to form projecting and spaced apart lands 62a. The shape of the concave engaging edge 62 and the provision of flat engaging surfaces at the outer edge 54 of bar portion 52a produces an engaging bar 52 for the feed roller which is intended to achieve only partial penetration of the bark of a felled tree while avoiding appreciable penetration of the engaging bar into the wood fibre portion thereof. In this manner, radial shearing of the bark is lessened and the compressive action of the engaging bar 52 required for compression debarking is enhanced. As well, damage to the wood fibre of a log is thereby averted or minimized. Thus, the outer edge 54 of an engaging bar 52 presents blunt longitudinally extending projections thereon, such as the lands 62a which constitute means for applying compressive force to the bark of the felled tree without substantially effecting the radial shearing thereof. Preferably, the blunt projections are disposed along substantially the entire length of each engaging bar 52. Other blunt profiles of the outer edge of the engaging bars for achieving the foregoing purpose will be apparent to those skilled in this art.

Figure 14:
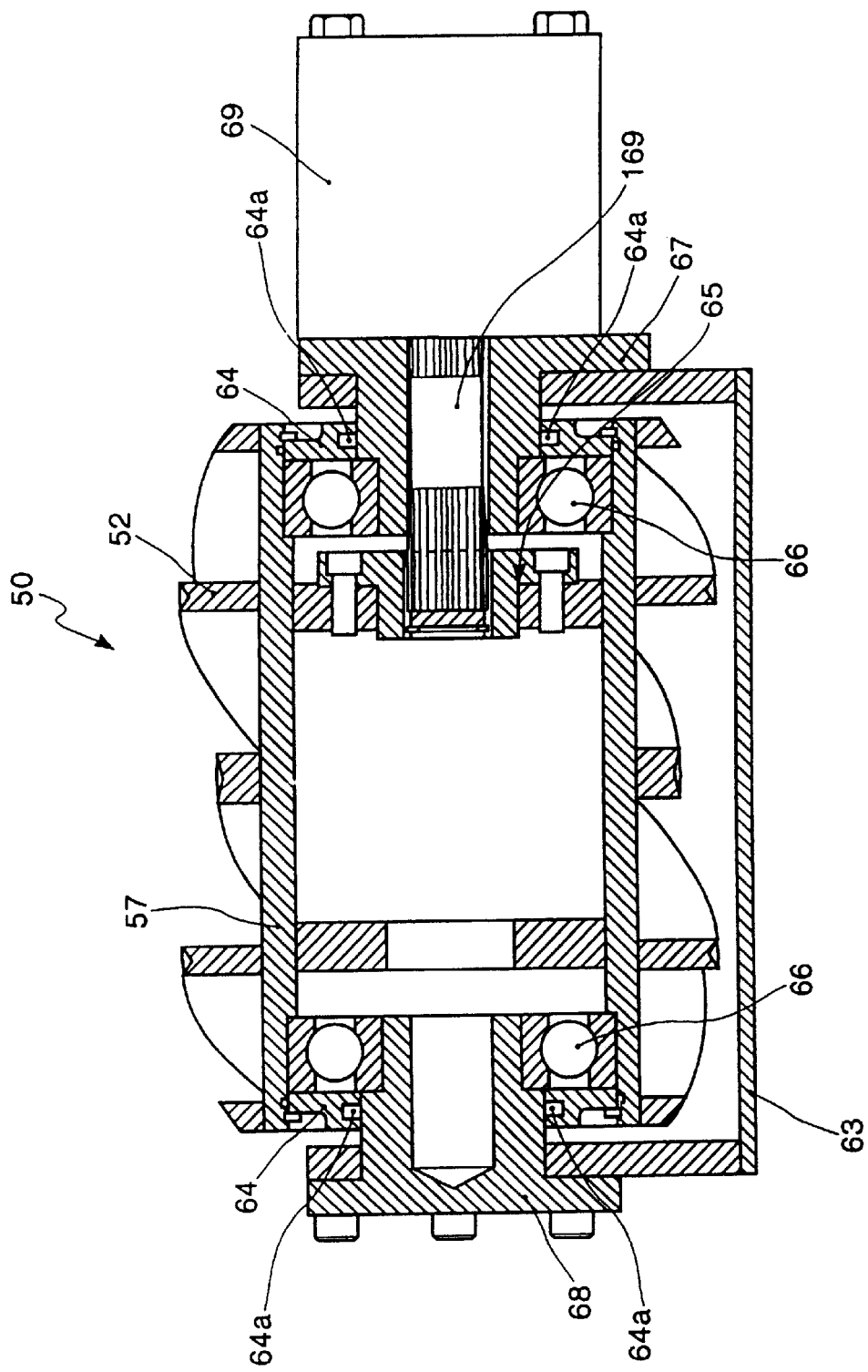
FIG. 14 is a schematic cut-away section of a feed roller and housing according to another aspect of the present invention.

With reference to FIG. 14, each feed roller 50 is rotatably mounted in a roller housing 63. Base section 57 of the roller 50 is provided as a hollow cylinder containing an internal drive hub 65 and end bearings 66 to enable rotational movement of roller 50 with respect to end axles 67, 68 which are fixedly attached to housing 63. Seal plates 64 are provided at each end of base section 57 of the roller to contain a bearing and hub lubricant and to prevent its contamination. The seal plates provide peripheral seats 64a for receiving a sealing means therein (not shown) in contact with the end axles 67, 68. The drive means for the roller 50 preferably consists of a reversible hydraulic motor 69, such as the OMTS 400 low-speed high-torque orbital motor supplied by Danfoss A/S of Denmark. Hydraulic motor 69 provides a splined drive shaft 169 for engagement with a corresponding splined surface of the drive hub 65.

The feed roller, housing and motor assembly described above results in a relatively compact arrangement, due to the hollow nature of the feed roller base section, which serves as a lubricant containment means. In this manner, the motor 69 need not be provided with an additional casing extension for lubrication of its drive shaft 169, as the feed roller base section itself houses the necessary lubricant therefor. As such, the roller, housing and motor assembly is rendered more compact, along the direction of the rotational axis of the feed roller, than would be the case if the motor were required to have a dedicated casing extension surrounding its drive shaft.

With reference to FIGS. 15 and 16, one of the feed rollers of the workhead 10 may be provided as a retractable cushion roller 39 in the main body 11 of the workhead. The cushion roller is mounted on a housing or swinging arm 156 which is pivotally connected to the main body 11 as at 157. Swinging arm 156 is biased to a retracted position by way of one or more coil springs 158 or other like means. One end of each coil spring 158 is attached to the free end 160 of the swinging arm 156, whereas the other end of each spring is attached to the main body 11 as at 162. The movement of swinging arm 156 between an operative position, in which the cushion roller 39 engages a log, and a retracted position in which the log is not engaged, may be achieved by means of a hydraulic actuator 164 or the like. When the workhead 10 is in a processing mode, such as during delimbing and debarking operations, the hydraulic actuator 64 is activated and the cushion roller 39 is pushed forward to engage a log being processed. In all other modes of operation, such as during felling and grappling, hydraulic actuator 164 is not activated and the cushion roller remains in a retracted position due to the biasing effect of coil spring 162.

The mechanism of the retractable cushion roller discussed above ensures maximum clamping stability of a tree during felling, handling and carriage, since retraction of swinging arm 156 will cause a log held by the jaw arms of the workhead 10 to be clamped against portions of the main body of the head, such as the fixed delimbing knife 27. Thus, when cushion roller 39 is retracted, the reaction to the forces produced on a tree stem by the closed jaw assembly 30 of the workhead is through the tree and onto the frame of the head, instead of onto the cushion roller 39. This improves the grappling stability of the workhead, especially when a tree is in a vertical position such as immediately following felling.

Figure 17:
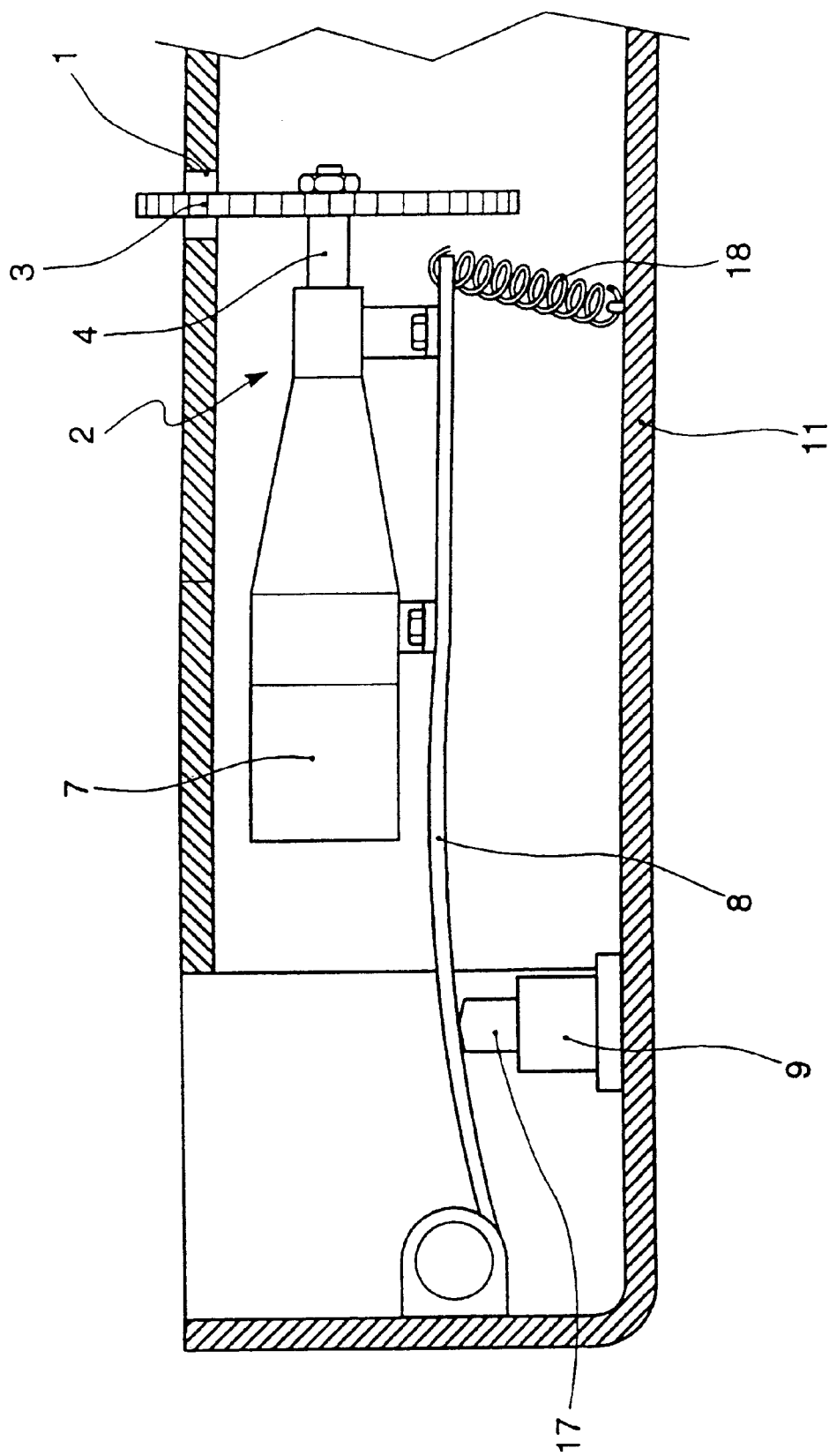
FIG. 17 is a partial cross-sectional view of the main body of the workhead of FIG. 1, showing a retractable length measuring device for use with the present invention.

Turning now to FIG. 17, the details of a measuring device 2 which may be mounted in the main body 11 of the workhead for measuring the length of logs to be cut during bucking operations is next discussed. The measuring device 2 consists of a toothed wheel 3 mounted onto the rotatable shaft 4 of a measuring transducer 7 well known to those skilled in this art. The transducer 7 is mounted onto a resilient biasing means, such as a leaf spring 8 fixedly mounted to an inside surface of main body 11 of the workhead. This resilient mounting mechanism is intended to cause the wheel 3 to maintain contact while accommodating dimensional variances and surface discontinuities encountered along the length of a processed log. A hydraulic actuator 9 may be provided with the measuring device 2, and the actuating ram 17 thereof may be extended as shown in FIG. 20 against leaf spring 8 so as to cause the wheel 3 of the measuring device 2 to extend through corresponding slot 1 provided in main body 11. This enables the measuring device 2 to be retracted when not in use, and a coil spring 18 or the like may be used to bias the measuring device to its retracted position. Other measuring devices may be incorporated for use with the workhead according to the present invention, for instance, devices which provide information as to the diameter or circumference of processed logs along their length.

Referring to FIGS. 18 to 20, the workhead in this second embodiment of the present invention is particularly suitable for lifting and carrying one or more logs from one site to another. The workhead includes a jaw assembly 40 comprising two sets of cooperating arms, the first set denoted 41, 42 and the second set denoted 43, 44. The arms in each of the cooperating sets are slightly off-set from one another, with arms 42, 44 being shorter in length than arms 41, 43 as best seen in FIG. 20. Thus, the arms 42, 44 can pivotally move within arms 41, 43. Cross-members 45 and 46 join respective adjacent jaw arms 42 and 44 and 41 and 43 of each of the sets of arms. The workhead according to the embodiment illustrated in FIGS. 18 to 20 provides the same wrist connection 5 as the first embodiment of the workhead discussed above. However, the device of FIGS. 18 to 20 need not be provided with feed rollers 50. The arm arrangement of this device is such that a shearing action is produced when closing the arms, the shearing action being provided by the relative movement and positions of the cross-members 45 and 46. This permits the severance of unwanted plant material such as vines which may need removing prior to felling.

A preferred hydraulic circuit for the workhead of FIG. 1 of the present invention is described with reference to FIG. 21. Those skilled in this art will appreciate that alternative hydraulic circuit layouts may also be used in order to operate and control the various workhead devices mentioned above. The preferred circuit for use with the present invention is a load sensing pressure compensating circuit. The circuit comprises a pressure compensated hydraulic fluid supply in the form of two main hydraulic pumps 120, each having a maximum displacement of 250 1/min and maximum pressure of 325 Bar. The pumps 120 are connected through a bank of primary hydraulic valves 122 and secondary hydraulic valves 124 to provide preselected rates of maximum fluid flow to individual hydraulic circuits associated with each powered device of the workhead. For instance, the hydraulic circuit 126 for powering the respective hydraulic motors 165 to 168 associated with the feed rollers 36 to 39, and the circuit 128 for powering the hydraulic actuator mechanism 14 of the coupling means 13 for the workhead, may each be supplied at a maximum rate of fluid displacement of 250 l/min. Hydraulic circuit 130, which serves to power the cushion roller hydraulic actuator 164, the drive arms 31 and delimbing arms 21 of the jaw assembly 30 and the saw attachment 6, may be supplied at a maximum rate of fluid displacement of 180 1/min. Finally, hydraulic circuit 132, which serves to power the hydraulic motors 108 which constitute the drive means of the slew bearing 80, may be supplied at a maximum rate of fluid displacement of 120 l/min.

A pilot hydraulic pump 12 1 or the like may be used in the preferred circuit as a charge pump to operate the primary hydraulic valves 122 and secondary hydraulic valves 124 in a manner well known to those skilled in this art. The pilot pump line includes a check valve 123. A fluid return line through hydraulic filter 134 to drain 135 is also provided from the secondary hydraulic valves 124.

Hydraulic circuit 126 for powering the feed roller motors 165 to 168 is provided with a four-way flow divider 136 to equalize fluid flow to the roller motors and thereby maintain a synchronized rotational speed of the feed rollers, irrespective of torque demand. The four-way divider 136 therefore prevents fluid runaway to the feed roller having the lowest pressure demand of the feed roller assembly. This ensures that when one or more drive rollers momentarily lose contact with a log due to surface discontinuities or abrupt dimensional variances as may be caused during the processing of a crooked tree, the remaining drive rollers in contact with the log will continue to be operational at the intended rate of hydraulic fluid supply. The four-way divider may be in the form of a single unit, for instance the Type MH 4 FA supplied by Mannesmann Rexroth GmbH of Germany. Those skilled in this art will appreciate that other means may be employed to accomplish the equalized flow to the feed roller motors, such as the use of pressurecompensated directional control valves, the provision of multiple two-way flow dividers to achieve the same four-way equalized flow, or the use of a dedicated hydraulic circuit furnished with individual equal displacement pumps for each feed roller motor.

The hydraulic circuit 130 is designed to provide for two distinct and selectable arm clamping pressures for various timber processing operations. For instance, in its higher-pressure "hard clamp" mode, the drive arms 31 and delimbing arms 21 of the jaw assembly 30 may be used to hold a tree in an upright position during felling with the saw attachment 6, or to grapple one or more processed logs. In its lower-pressure "soft clamp" mode, the arms may be used for delimbing and debarking operations. Each drive arm set and delimbing arm set is provided with its own circuit leg, such that the operator can select a soft clamp for the delimbing arms and a hard clamp for the drive arms, for instance, as at the beginning of the delimbing process to facilitate the required axial translation of the tree being processed.

Each circuit leg for the jaw assembly 30 provides a downstream pressure compensated flow control valve 138 followed by a directional flow valve 140 which is used to selectively encounter or bypass a pressure reducing valve 142. When directional valve 140 enables flow to pressure reducing valve 142, the particular arm pair of the circuit leg will operate in its soft clamp mode. When the directional flow valve 140 diverts flow from the pressure reducing valve 142, the particular arm pair will operate in its hard clamp mode. A further directional valve 144 is provided downstream of the pressure reducing valve 142 to enable return flow of hydraulic fluid in each leg of the circuit associated with an arm pair. Further downstream of the valves 140 and 144 is an arm actuating valve 146 to effect the opening and closing of a particular jaw arm pair by means of hydraulic actuator 148. A pressure relief valve 150 is also provided for each circuit leg of the jaw arms, and a single check valve 151 is provided for both circuit legs.

Hydraulic circuit 130 further provides a directional flow valve 152 for extending and retracting hydraulic actuator 164 associated with cushion roller 39. The presence of a relief valve 150 in the circuit 130 allows for the actuator 164 to retract upon an excessive radial load being applied to the cushion roller, for instance, as may occur during the processing of crooked tree.

A saw attachment actuating valve 154 completes the hydraulic circuit 130. The valve 154 controls fluid flow to the saw motor 155 and to a hydraulic actuator (not shown) for causing pivotal movement of the saw attachment 6 during felling and bucking operations. Those skilled in this art will appreciate that where a measuring device 2 is employed with the workhead 10, hydraulic supply lines and control valves will also be required to activate the extension and retraction of hydraulic actuator 9 associated with the measuring device. The manner of making such additions to the schematic hydraulic circuit illustrated in FIG. 21 will be apparent to those skilled in this art. As well, it will also be apparent to those skilled in the art to adapt the hydraulic circuit of FIG. 21 for use with the more simplified workhead according to its second embodiment, as shown in FIGS. 18 to 20.

The various actuating, directional, compensating, pressure reducing and relief valves provided in hydraulic circuit 130, and shown circumscribed by the rectangle 153 of FIG. 21, are preferably disposed on a block manifold located in the main body 11 of the workhead, as explained in greater detail herebelow.

Figure 23:
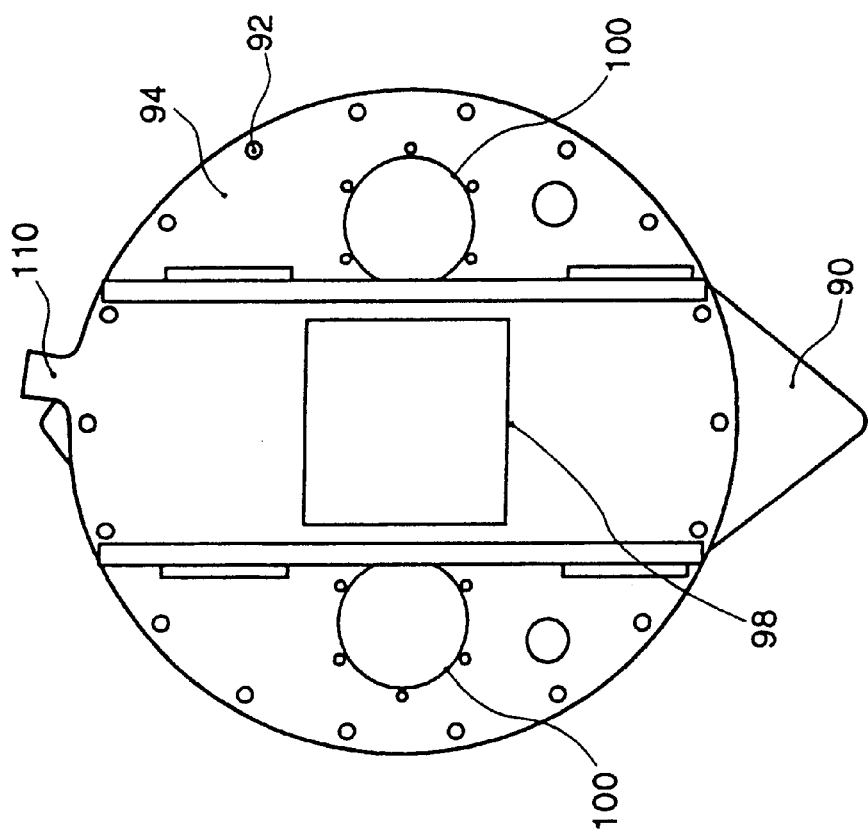
FIG. 23 is a top plan view of the slewing means of FIG. 22.
Figure 22:
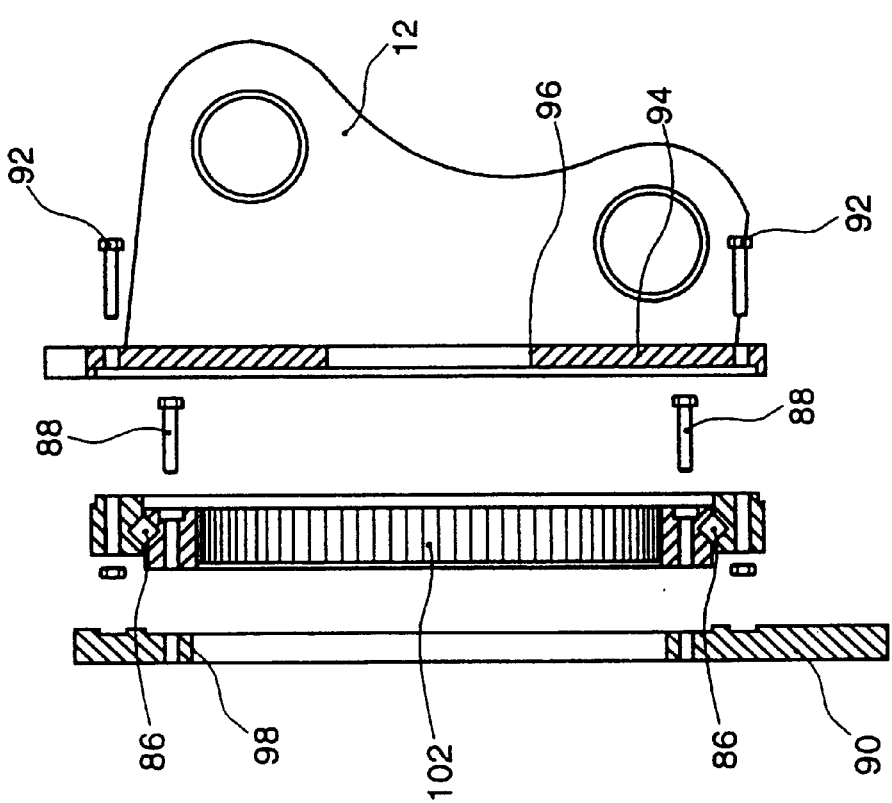
FIG. 22 is an exploded cross-sectional view of a slewing means according to yet another aspect of the present invention, the slewing means being suited for use with the workhead of the present invention.
Figure 24:
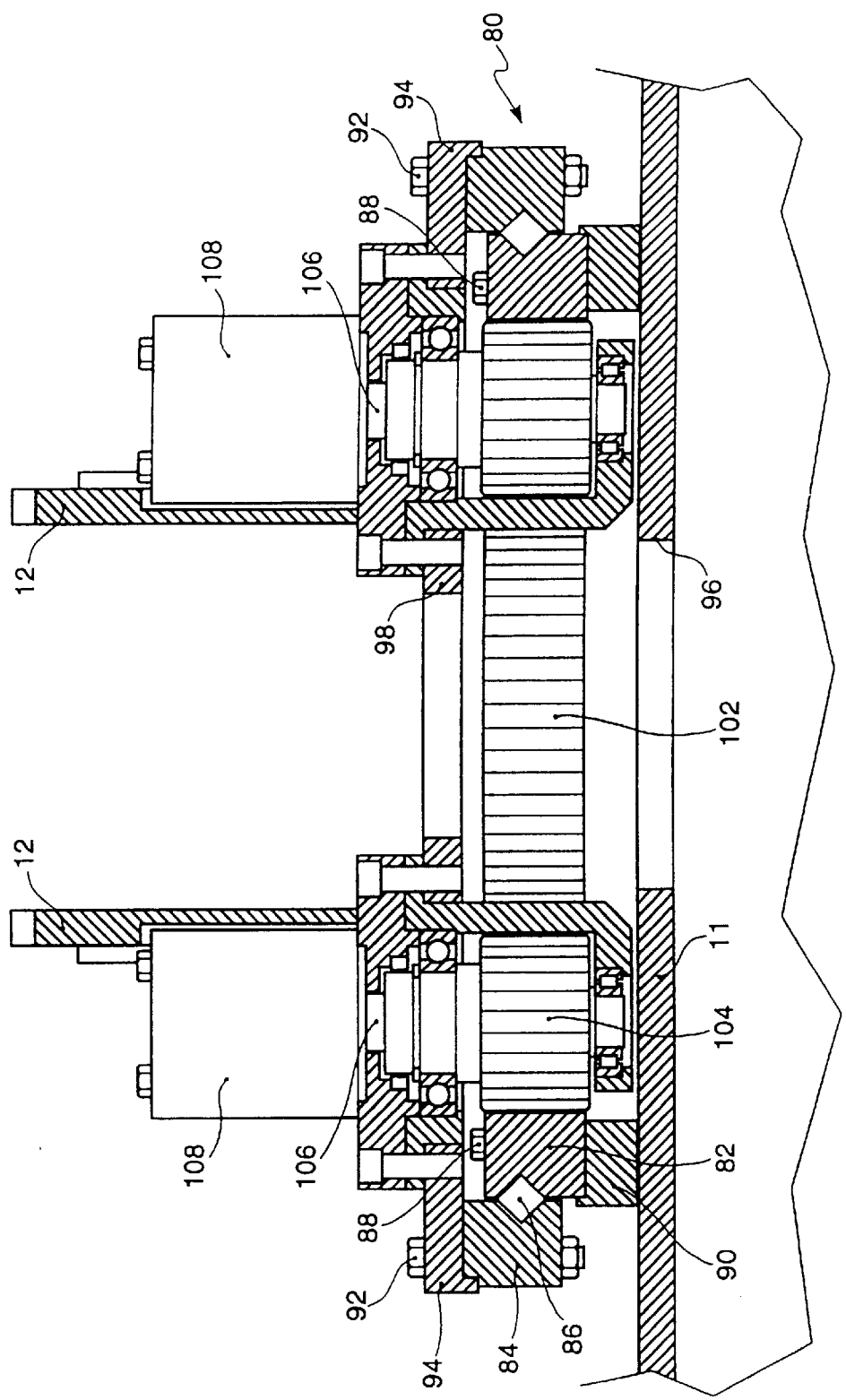
FIG. 24 is a detailed partial cross-sectional view of drive means for the slewing means of FIGS. 22 and 23.

Details of the slewing means for the wrist connection 5 of the timber processing workhead according to another aspect of the present invention are next explained with reference to FIGS. 22 to 24. The slewing means comprises a slew bearing 80 having a inner ring 82 and an outer ring 84. The inner and outer rings of the slew bearing are concentrically arranged for relative rotational movement, by means of roller bearings 86 or the like disposed circumferentially between the respective mating surfaces of each of the inner and outer rings. The inner ring 82 is fixedly attached by means of bolts 88 or the like to a bottom slew plate 90, itself fixedly attached to the main body 11 of the processing workhead. The outer ring 84 of the slew bearing is fixedly attached by means of bolts 92 or other like fastening means to a top slew plate 94, to which mounting bracket 12 is fixedly attached, for instance, by means of welded engagement.

The bottom slew plate 90 and top slew plate 94 each respectively provide centrally disposed apertures 96 and 98 to enable passage of hydraulic and electrical control lines for the various powered devices of the processing workhead, such as the jaw arm pairs 21 and 31, feed rollers 36 to 39, or saw attachment 6. The preferred means of supplying hydraulic and electrical control lines through the wrist connection 5 of the workhead is that of a swivel manifold combined with a block manifold, as described in greater detail herebelow. The top slew plate 94 further provides two additional apertures 100 to accommodate passage of drive means for the slew bearing 80 as next discussed.

The inside surface 102 of inner ring 82 of the slew bearing is toothed for driven engagement with the pinion 104 provided at the terminal end of drive shaft 106 of a motor 108. A second such arrangement of pinion, drive shaft and motor is provided radially adjacent the first drive arrangement, the first and second motors 108 being mounted in their respective apertures 100 provided on top slew plate 94. Preferably, the motors 108 are in the form of reversible hydraulic motors, which may be of the same type of hydraulic motors described above for driving the feed rollers 36 to 39 of the processing workhead. Those skilled in this art will appreciate that other forms of drive means could be utilized for the slew bearing 80.

A radial protrusion or tab 110 is provided on the top slew plate to prevent the continuous rotational movement of the stewing means by acting as a stop means in conjunction with a corresponding fixed engaging surface (not shown) located on the main body of the workhead. The purpose of the stop means is to prevent the undue entanglement or the outright severance of electrical control lines which pass through the slewing means by an unchecked rotation of the workhead in the same given direction. Other stop means for the stewing means of the workhead will be apparent to those skilled in this art.

Figure 25:
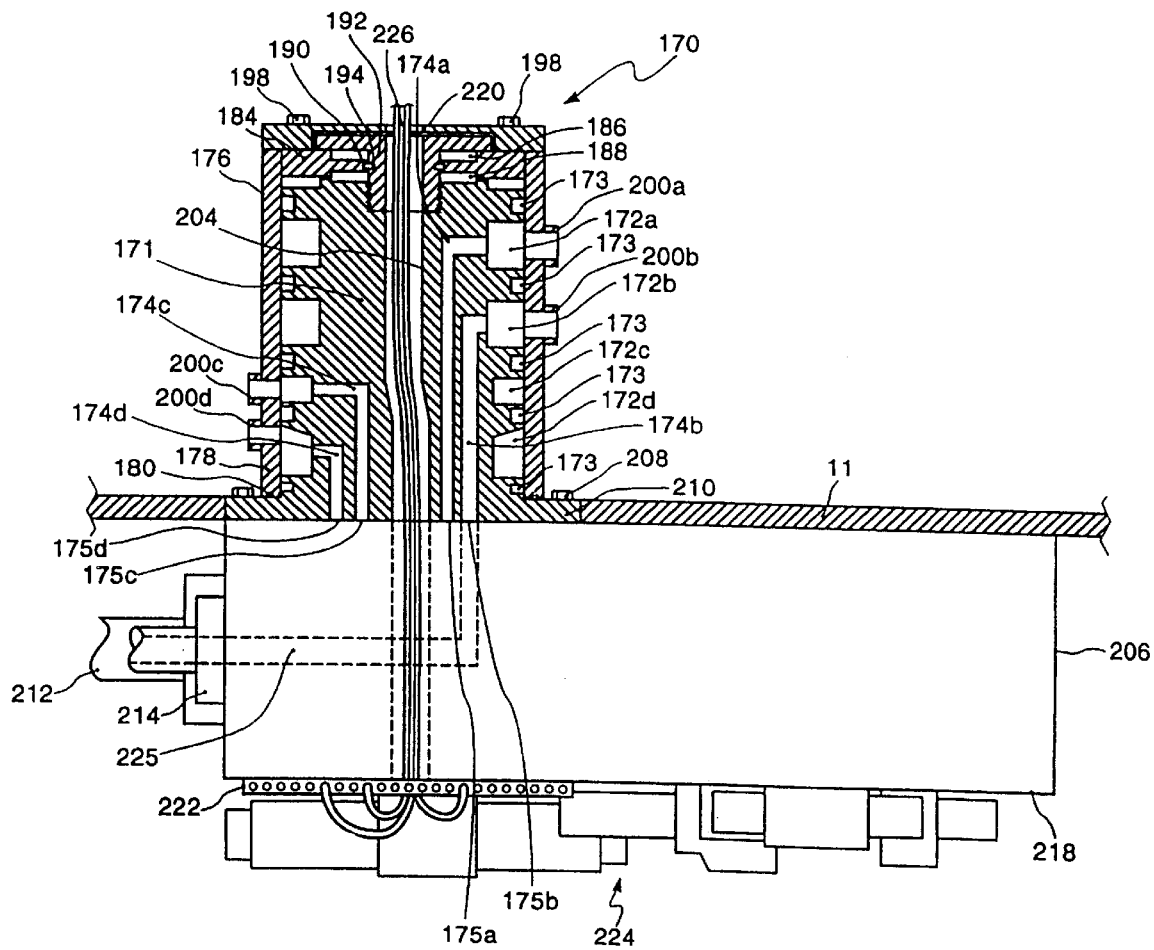
FIG. 25 is a schematic cross-sectional view of a swivel manifold and underlying block manifold provided in the main body of the workhead of the present invention.

With reference to FIGS. 25 and 26, the wrist connection 5 of the processing workhead 10 is associated with a fluid delivery means consisting of a swivel manifold 170 for through passage of hydraulic supply lines and electrical wiring for controlling and driving the various powered devices of the workhead. Swivel manifold 170 comprises an internal substantially cylindrical rotor portion 171 whose outer surface is provided with a plurality of circumferential fluid receiving or fluid egress channels 172a to 172d. Each of the channels 172a to 172d is sealed by adjacently disposed pressure seals (not shown) located in circumferential seats 173. The channels 172a to 172d are each in respective fluid communication with corresponding through passages 174a to 174d which direct fluid flow to or from the circumferential channels to respective interface ports 175a to 175d provided on the underside of the rotor 171.

The rotor 171 is encased with an outer cylindrical sleeve portion 176, whose lower terminal end 178 provides a peripheral seat 180 therearound for receiving a sealing means, such as an O-ring seal (not shown). To the upper terminal ends 182 of the sleeve 176 is fixedly attached an end plate 184. The end plate 184 provides respective top and bottom annular channels 186 and 188 for receiving thrust bearings (not shown), well known to those skilled in this art. The end plate 184 has a central opening therein which provides a seal seat 190 for receiving a sealing means (not shown), such as an O-ring seal. Sleeve 176 is secured against the rotor 171 by means of an end plug 192 which may be threadedly engaged to the rotor. End plug 192 provides a seal seat 194 on its outer surface corresponding to seal seat 190 of end plate 184. A cap plate 196 is removably attached to rotor 171 by means of screws 198 or the like to complete the swivel manifold assembly.

Sleeve 176 is provided with fluid inlet or outlet ports 200a to 200d which are in respective fluid communication with the circumferential channels 172a to 172d. Each of the circumferential channels of the rotor portion is in constant fluid communication with its respective port of the sleeve portion throughout relative rotational movement of the rotor and sleeve. Hydraulic fluid supply or return hoses 202a to 202d are connected to the respective ports 200a to 200d (FIG. 26). The swivel manifold 170 is associated with a fixed or block manifold 206 and is mounted thereon by means of mounting screws 208 or the like provided through a bottom annular connecting flange 210 of the rotor 171. The block manifold 206 is itself fixedly mounted within the main body 11 of the workhead 10, such that the swivel manifold 170 extends outside of the main body 11 of the workhead along slew axis BB' (FIG. 4) through the respective apertures 98 and 96 of the bottom slew plate 90 and top slew plate 94 (FIG. 22).

Manifold block 206 is provided with appropriate internal passages in fluid communication with the interface ports 175a to 175b of rotor 171. One such passage 225 is shown in FIG. 25. The internal passages are in turn in fluid communication with a desired number of manifold inlet or outlet ports, as at 212 and 214, for hydraulic connection to the various devices of the workhead. For instance, outlet port 212 of the block manifold 206 is connected to the four-way flow diverter 136, itself connected to a plurality of hydraulic supply hoses 216 for each of the feed roller motors 165 to 168 of the workhead 10. Inlet port 214 is for returning hydraulic fluid from the feed roller motors.

Various actuating valves 146 and 154, flow control valves 138, directional valves 140 and 152, pressure reducing valves 142 and relief valves 150 of the hydraulic circuit for the workhead 10, collectively denoted as hydraulic control valves 224 in FIG. 25, may be mounted directly onto the underside 218 of the manifold block 206 in fluid communication through the manifold block with the appropriate interface ports 175a to 175d of the swivel manifold 170. Where the hydraulic control valves 224 of FIG. 25 are mounted directly onto the manifold block as mentioned above, those skilled in this art will appreciate that the various hydraulic fluid supply and return lines traced in the hydraulic circuit of FIG. 21, and shown bounded by rectangle 153 thereof, are provided as respective internal passages within the manifold block 206. For instance, inlet and outlet passages will be provided in the manifold in respective fluid communication with inlets and outlets of the hydraulic valves, so as to avoid the need for hose connections to the valves.

A wiring passage 204 is provided in the rotor 171 and end plug 192 for housing and transmission of electrical wiring 226, which is introduced through the swivel manifold 170 by means of an aperture 220 (FIG. 25) provided in cap plate 196 along slew axis BB' (FIG. 4). As well, electrical wiring received from passage 204 of the swivel manifold may be passed through the manifold block 206 for connection to an electrical terminal strip 222 which may also be mounted on the underside 218 of manifold 206.

By furnishing a larger surface area for the various hydraulic and electrical connections, accessibility for maintenance purposes is enhanced by use of the manifold block 206. As well, by providing a swivel manifold in conjunction with a block manifold, hydraulic supply hoses to the workhead 10 may be shortened, since there is no need for the rotational movement of the wrist connection to be accommodated by slack in the supply hoses. This results in a compact design which minimizes hose chaffing and snagging during field use of the workhead 10.

Finally, those skilled in this art will appreciate that the inventive concept in any of its foregoing aspects can be incorporated, adapted or modified in many different constructions, so that the generality of the preceding description is not to be superseded by the particularity of the attached drawings. Thus, various alterations, modifications and/or additions may be incorporated into the various constructions and arrangements of parts and devices described herein without departing from the spirit or scope of the present invention.

We claim:

1. A workhead for timber processing, the workhead comprising:

(a) a main body;
(b) mounting means for attachment of the main body to a support structure;
(c) wrist means for pivotal movement of the main body relative to the support structure about a pivot axis and for slewing movement of the main body relative to the support structure about a slew axis;
(d) hydraulically powered timber processing means provided with the main body;
(e) fluid delivery means for supplying hydraulic fluid to the powered timber processing means, the fluid delivery means comprising a swivel hydraulic manifold extending externally of the main body along the slew axis and a fixed hydraulic manifold attached to the main body, the swivel manifold comprising a substantially cylindrical rotor portion and a corresponding sleeve portion in sealed rotational engagement therewith, the rotor portion being attached to the fixed manifold, the sleeve portion providing a fluid inlet port and the rotor portion providing a corresponding fluid receiving channel disposed circumferentially along an outer surface thereof, the fluid receiving channel being in constant fluid communication with the fluid inlet port of the sleeve portion throughout relative rotational movement of the rotor portion and the sleeve portion, the fluid receiving channel being in fluid communication with a corresponding fluid through passage provided in the fixed manifold, the fixed manifold providing an outlet port on an external surface thereof in fluid communication with the fluid through passage thereof; and wherein the outlet port of the fixed manifold supplies hydraulic fluid received from the inlet port of the swivel manifold to the powered timber processing means of the main body of the workhead.

2. The workhead according to claim 1, wherein the fluid delivery means further comprises a fluid outlet port provided with the sleeve portion, the rotor portion further providing a fluid egress channel disposed circumferentially along an outer surface thereof, the fluid egress channel being in constant fluid communication with the fluid outlet port of the sleeve portion throughout relative rotational movement of the rotor portion and the sleeve portion, the fluid egress channel being in fluid communication with a second corresponding fluid through passage provided in the fixed manifold, the fixed manifold providing an inlet port on an external surface thereof in fluid communication with the second fluid through passage thereof, and wherein the inlet port of the fixed manifold returns hydraulic fluid received from the powered timber processing means of the main body of the workhead to the outlet port of the swivel manifold.

3. The workhead according to claim 2, wherein a plurality of hydraulically powered timber processing means is provided with the main body, the sleeve portion of the swivel manifold providing a plurality of fluid inlet ports and the rotor portion of the swivel manifold providing a corresponding plurality of fluid receiving channels in respective independent fluid communication therewith, and wherein a plurality of fluid through passages is provided in the fixed manifold in fluid communication with fluid receiving channels of the rotor portion for supplying hydraulic fluid through a plurality of outlet ports on the fixed manifold to respective powered timber processing means of the workhead.

4. The workhead according to claim 3, wherein the sleeve portion of the swivel manifold provides a plurality of fluid outlet ports and the rotor portion of the swivel manifold provides a corresponding plurality of fluid egress channels in independent fluid communication therewith, and wherein a plurality of fluid through passages is provided in the fixed manifold in fluid communication with the fluid egress channels of the rotor portion for returning hydraulic fluid received from the powered timber processing means of the workhead through a plurality of inlet ports on the fixed manifold to outlet ports of the swivel manifold.

5. The workhead according to claim 3, wherein the fluid delivery means further includes a hydraulic control valve having a valve inlet and a valve outlet in fluid communication with a fluid through passage of the fixed manifold for control of fluid flow therethrough, the hydraulic control valve being mounted onto an external surface of the fixed manifold, the fixed manifold providing inlet and outlet passages therein in respective fluid communication with the valve inlet and valve outlet.

6. The workhead according to claim 3, wherein the rotor portion of the swivel manifold provides a wiring passage therethrough for transmission of electrical wiring, the sleeve portion of the swivel manifold and the fixed manifold each providing corresponding wiring passages in communication with the wiring passage of the rotor, the wiring passage of the sleeve portion being located substantially along the slew axis of the main body.

7. The workhead according to claim 6, further comprising an electrical terminal strip mounted onto an external surface of the fixed manifold, the terminal strip providing connections for electrical wiring transmitted through the respective wiring passages of the sleeve portion, rotor portion and fixed manifold.

8. The workhead according to claim 5, wherein the fixed manifold is generally parallelopiped in shape, the rotor portion of the swivel manifold providing an end flange for mounting of the swivel manifold onto an external surface of the fixed manifold.

9. The workhead according to claim 8, wherein the fixed manifold is a rectangular block.

10. The workhead according to claim 1, wherein the hydraulically powered timber processing means comprises a jaw assembly for grappling timber, the jaw assembly including a cooperating pair of jaw arms, each of the jaw arms having a free end and a connected end, the connected ends of the jaw arms each being pivotally mounted to the main body for relative movement of the jaw arms of the cooperating pair between an operative position, wherein the free ends of the jaw arms of the cooperating pair are brought towards each other to grapple timber therebetween, and a release position, wherein the free ends of the jaw arms of the cooperating pair are spaced apart from each other to surrender said timber, the workhead further comprising hydraulic actuating means for the jaw assembly, the hydraulic actuating means constituting means for effecting the relative movement of the jaw arms of the cooperating pair between the respective operative and release positions thereof.

11. The workhead according to claim 10, wherein the jaw assembly comprises two cooperating pairs of jaw arms, a jaw arm in each pair being mounted adjacent a jaw arm of the other pair along a same side of the main body of the workhead.

12. The workhead according to claim 10, wherein respective planes of pivotal motion corresponding to the jaw arms of each cooperating pair of jaw arms of the jaw assembly are offset and substantially parallel.

13. The workhead according to claim 12, wherein adjacent jaw arms of the jaw assembly mounted along a same side of the main body of the workhead are each shorter in length than adjacent jaw arms mounted along another side of the main body.

14. The workhead according to claim 13, wherein adjacent jaw arms of the jaw assembly mounted along a same side of the main body of the workhead are connected together adjacent the free ends thereof by means of a cross-member.

15. The workhead according to claim 14, wherein said adjacent jaw arms of the jaw assembly mounted along a same side of the main body of the workhead which are shorter in length are spaced closer together than and between said adjacent jaw arms mounted along another side of the main body.

16. The workhead according to claim 11, wherein each cooperating pair of jaw arms has a respective hydraulic actuating means therefor, the fixed hydraulic manifold providing two outlet ports for supply of hydraulic fluid, each of the actuating means being supplied with hydraulic fluid from a respective outlet port of the fixed manifold.

17. The workhead according to claim 16, wherein one of the cooperating pairs of jaw arms of the jaw assembly constitutes a timber delimbing means providing cutting blades respectively on each of the jaw arms thereof, and wherein the hydraulically powered timber processing means further comprises a feed roller assembly having a plurality of feed rollers driven in cooperative rotation for translating a felled tree along a longitudinal axis thereof through the delimbing means when the jaw arms thereof are actuated to the operative position to encircle the felled tree about its circumference, the delimbing blades being positioned on the jaw arms of the delimbing means to effect delimbing of the felled tree as it is axially translated therethrough.

18. The workhead according to claim 17, wherein the feed roller assembly comprises two feed rollers, each of the two feed rollers being associated with the respective jaw arms of a cooperating jaw arm pair of the jaw arm assembly other than the jaw arms of the delimbing means, the feed rollers each engaging the felled tree when the jaw arms associated therewith are actuated to the operative position, the feed rollers each having a respective axis of rotation substantially parallel to respective planes of pivotal motion corresponding to the jaw arms associated therewith.

19. The workhead according to claim 17, further comprising a delimb knife provided with the main body and being positioned thereon to effect delimbing of the felled tree as it is axially translated thereagainst by the feed roller assembly.

20. The workhead according to claim 18, wherein the feed rollers are each rotatably mounted onto the respective jaw arms of the cooperating jaw arm pair of the jaw arm assembly other than the jaw arms of the delimbing means.

21. The workhead according to claim 20, further comprising a third feed roller associated with the main body.

22. The workhead according to claim 21, wherein the third feed roller is rotatably mounted on the main body, for pivotal movement relative thereto, between an operative position wherein the third feed roller engages a tree trunk being grappled by the jaw assembly and a retracted position wherein the third feed roller disengages the tree trunk.

23. The workhead according to claim 22, wherein a plane of pivotal motion of the third feed roller is substantially parallel to the planes of pivotal motion corresponding to the jaw arms of each cooperating pair of jaw arms of the jaw assembly, an axis of rotation of the third feed roller being substantially co-planar to the plane of pivotal motion thereof.

24. The workhead according to claim 22, wherein the third feed roller is mounted within a housing which is pivotally connected to the main body.

25. The workhead according to claim 24, wherein the third feed roller is biased to the retracted position thereof and wherein the workhead further comprises an actuating means for actuating the third feed roller to the operative position thereof.

26. The workhead according to claim 25, wherein the third feed roller is biased by means of a coil spring having one end thereof attached to the housing and another end thereof attached to the main body, and wherein the actuating means is a hydraulic actuator mounted onto the main body to effect the pivotal movement of the housing to the operative position thereof when the actuator is caused to be extended.

27. The workhead according to claim 24, further comprising a fourth feed roller associated with the main body, the fourth feed roller having an axis of rotation which is substantially parallel to the axis of rotation of the third feed roller.

28. The workhead according to claim 21, wherein the feed rollers are driven in cooperative rotation for rotating a felled tree about the longitudinal axis thereof as the tree is being translated.

29. The workhead according to claim 28, wherein the feed roller assembly constitutes means for compression debarking of the felled tree as it is driven thereby.

* * * * *